(12) United States Patent
Kato et al.

(10) Patent No.: US 8,169,301 B2
(45) Date of Patent: May 1, 2012

(54) RFID TAG INFORMATION COMMUNICATING APPARATUS

(75) Inventors: Takaaki Kato, Nagoya (JP); Mitsuru Nakamura, Kasugai (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 889 days.

(21) Appl. No.: 12/221,248

(22) Filed: Jul. 31, 2008

(65) Prior Publication Data
US 2009/0033468 A1 Feb. 5, 2009

(30) Foreign Application Priority Data

Aug. 2, 2007 (JP) ................................ 2007-201709
Aug. 2, 2007 (JP) ................................ 2007-201710

(51) Int. Cl.
*H04Q 5/22* (2006.01)
*G08B 13/14* (2006.01)
*G06F 7/00* (2006.01)

(52) U.S. Cl. ...................... 340/10.1; 340/10.3; 340/10.4; 340/10.5; 340/10.6; 340/572.1; 235/376

(58) Field of Classification Search ......................... None
See application file for complete search history.

(56) References Cited

U.S. PATENT DOCUMENTS

| 6,614,235 | B2* | 9/2003 | Kraz ............................. 324/457 |
| 2003/0062409 | A1* | 4/2003 | Kimura et al. ................ 235/380 |
| 2007/0001810 | A1* | 1/2007 | Scott et al. ................... 340/10.1 |
| 2007/0138281 | A1 | 6/2007 | Moriyama et al. |
| 2007/0170267 | A1* | 7/2007 | Kang et al. .................... 235/492 |
| 2008/0030245 | A1* | 2/2008 | Elrod et al. ................... 327/143 |
| 2008/0211630 | A1* | 9/2008 | Butler et al. ................. 340/10.1 |

FOREIGN PATENT DOCUMENTS

| JP | 2003-248796 | 9/2003 |
| JP | 2005-223401 | 8/2005 |
| JP | 2007-19692 | 1/2007 |
| JP | 2007108893 | 4/2007 |
| WO | WO 2007/043585 | 4/2007 |

* cited by examiner

*Primary Examiner* — George Bugg
*Assistant Examiner* — Renee Dorsey
(74) *Attorney, Agent, or Firm* — Day Pitney LLP

(57) ABSTRACT

This disclosure discloses an RFID tag information communicating apparatus, comprising an apparatus antenna device; a command transmission portion that generates and transmits a command signal for reading information from an RFID circuit element; an information acquisition portion that attempts a reception of a reply signal transmitted from said RFID circuit element in response to said command signal; and an electrostatic-safe communication control portion that controls at least said command transmission portion and repeatedly transmit a plurality of times said command signal to said RFID circuit element so that information substantially unaffected by static electricity is acquired by said information acquisition portion.

14 Claims, 16 Drawing Sheets

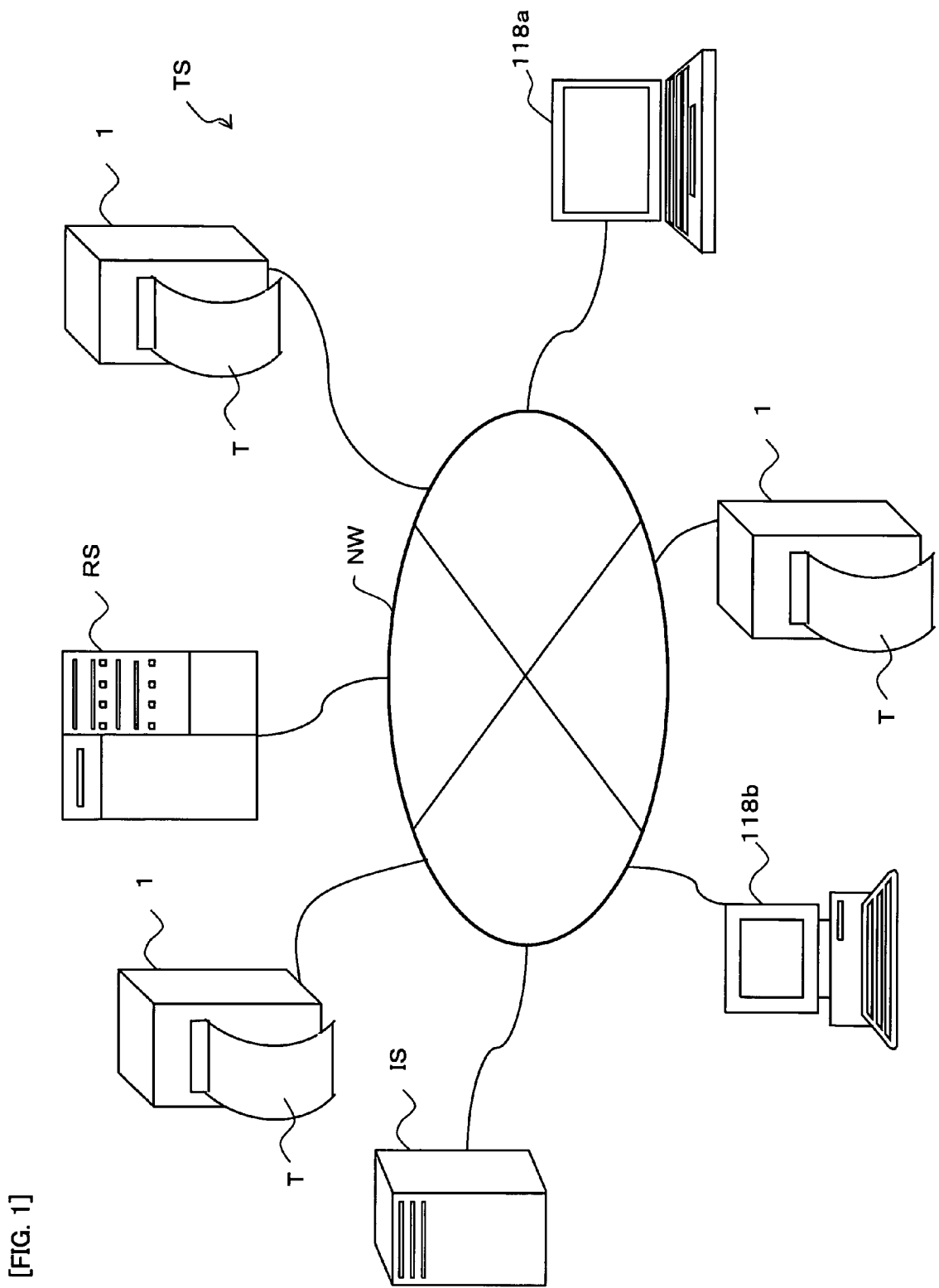
[FIG. 1]

[FIG. 2]
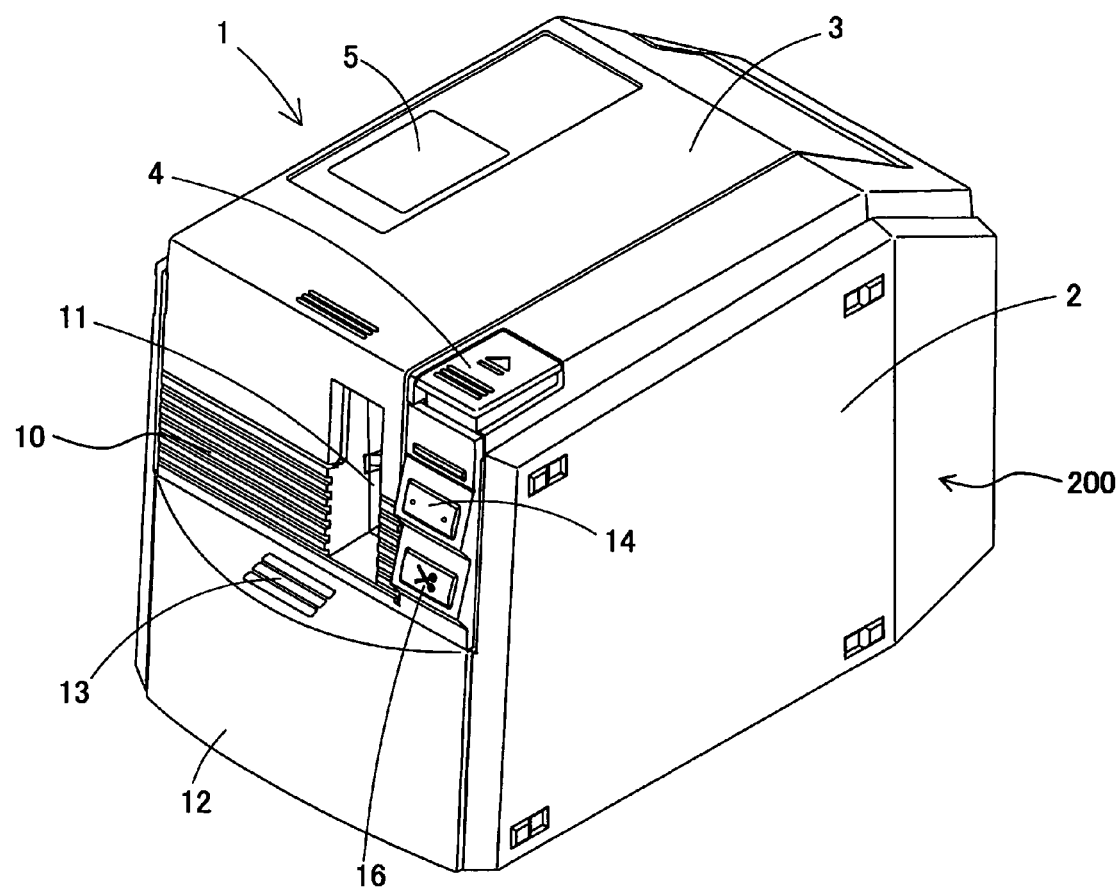

[FIG. 3]
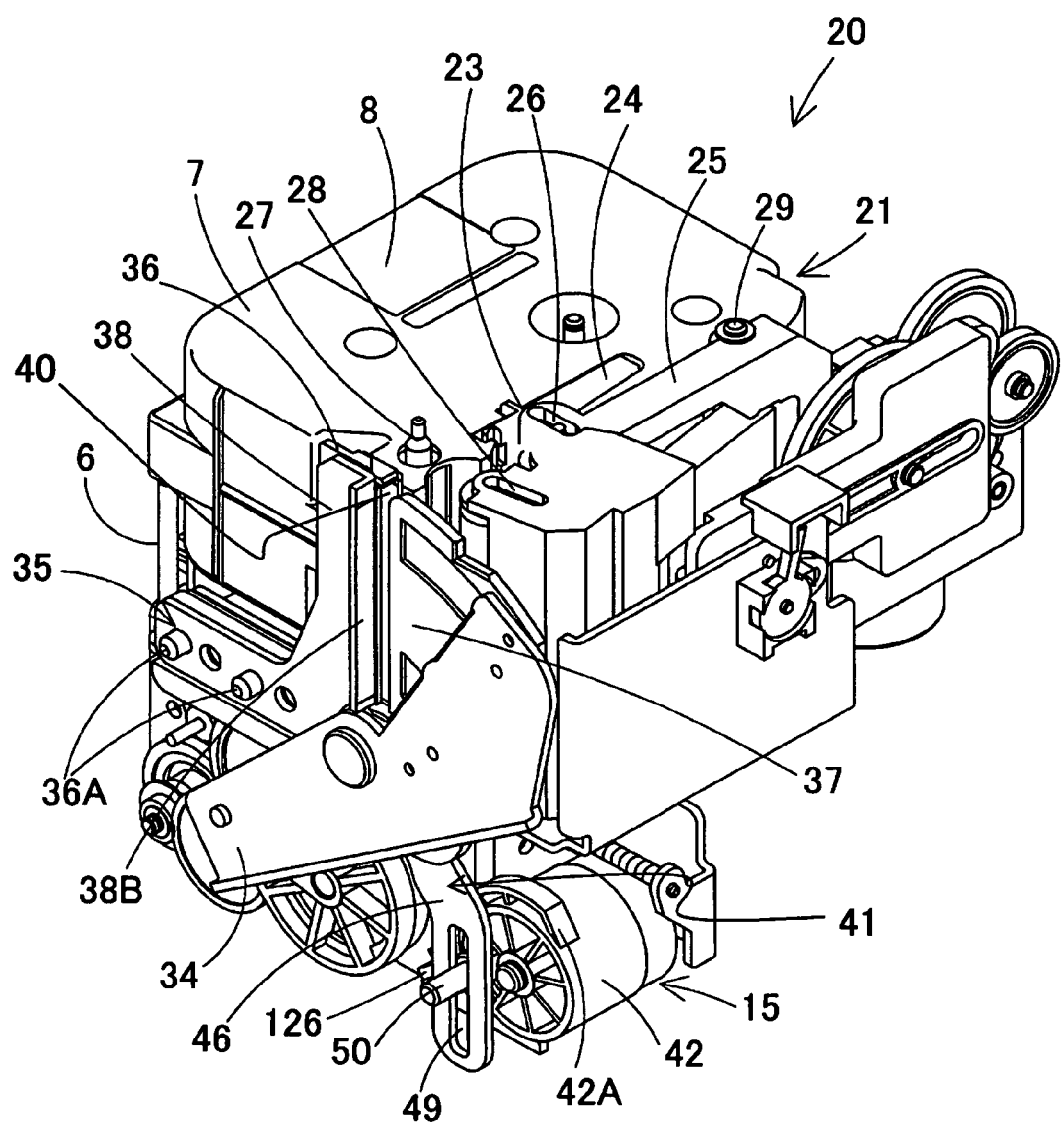

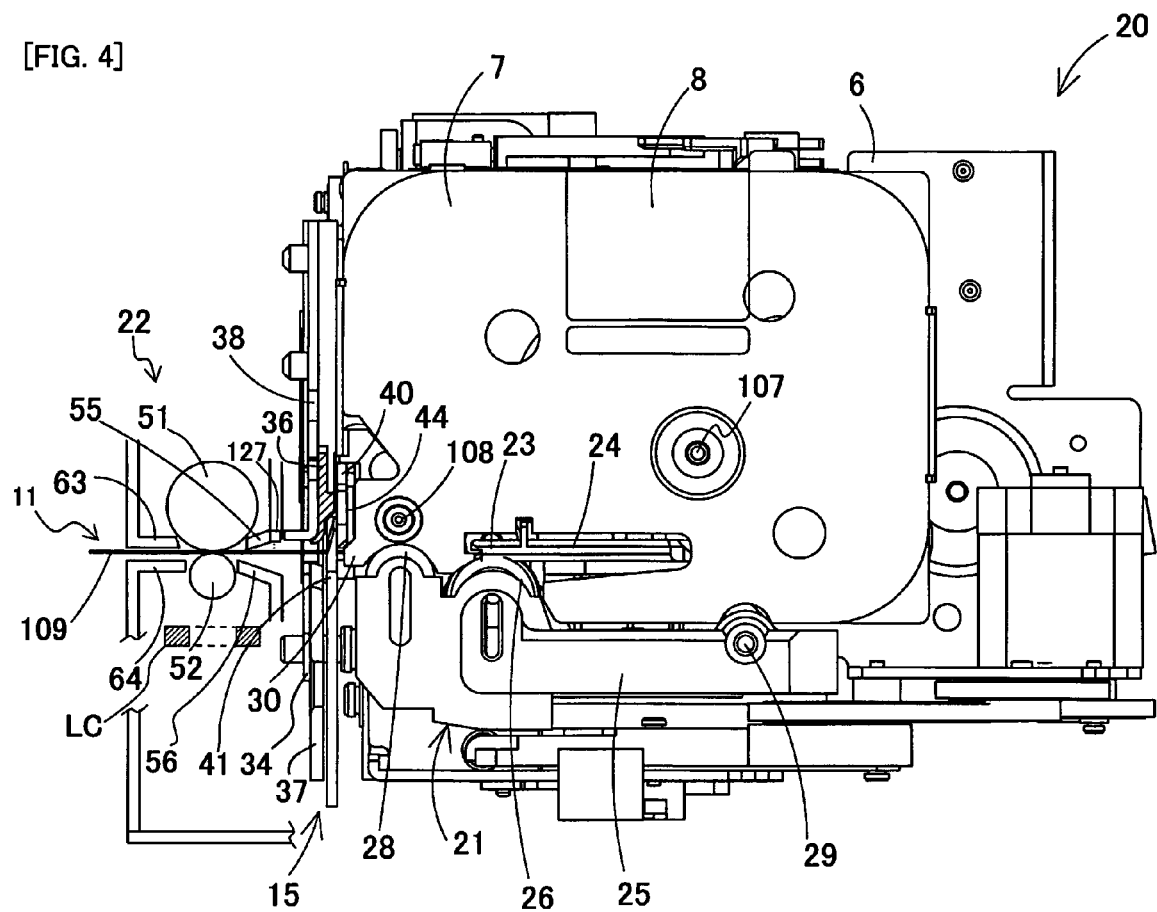
[FIG. 4]

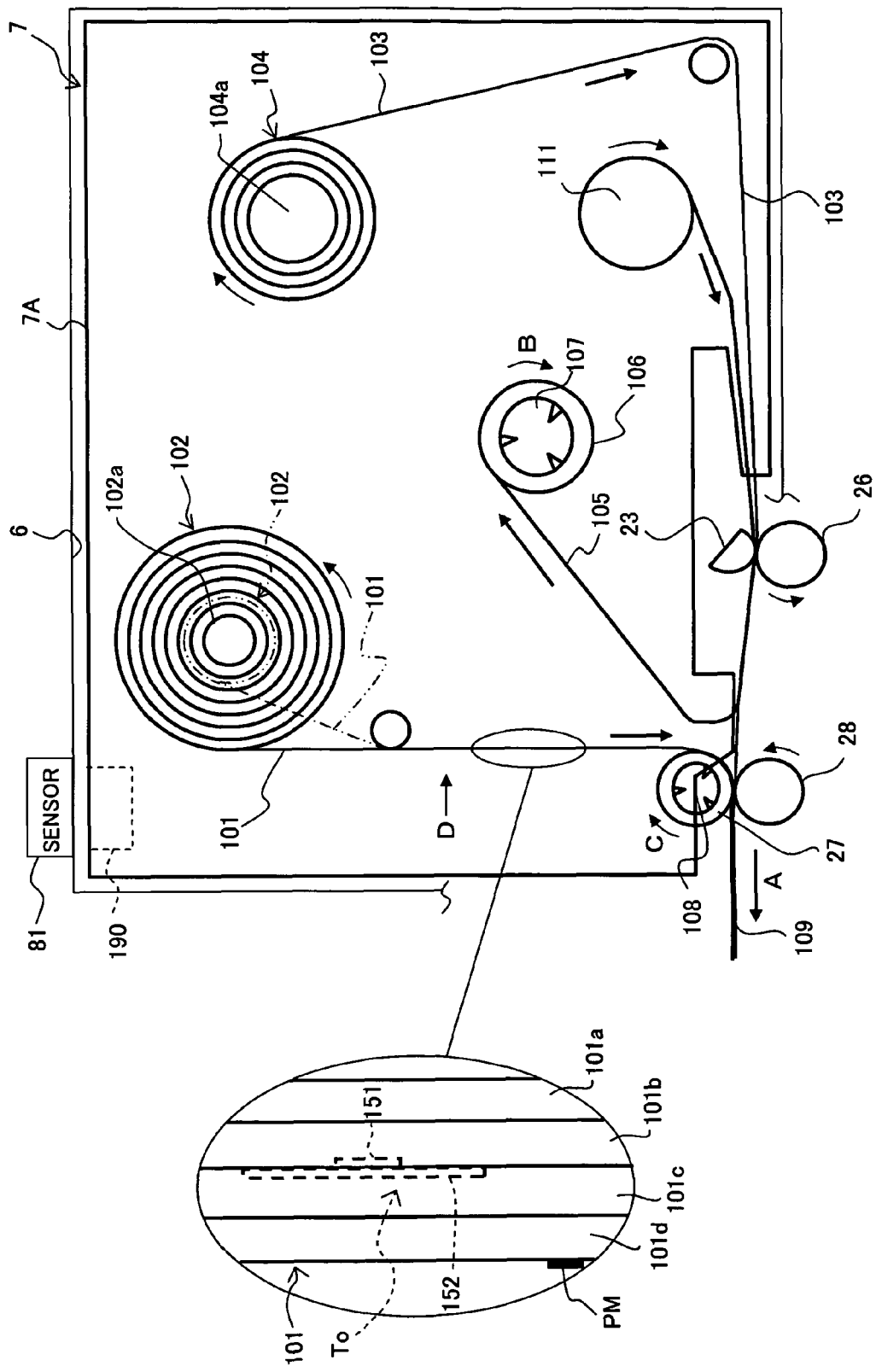
[FIG. 5]

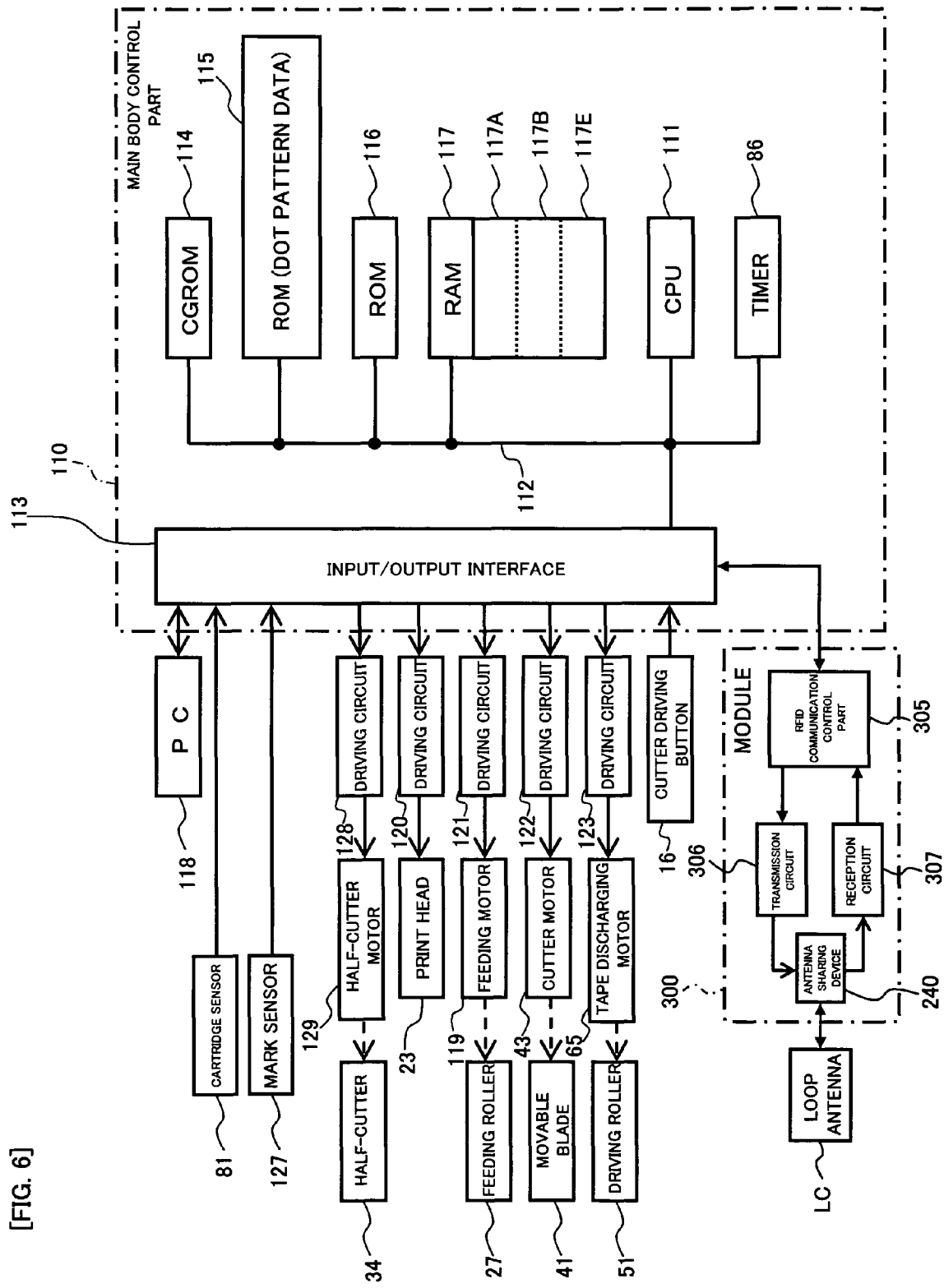
[FIG. 6]

[FIG. 7]
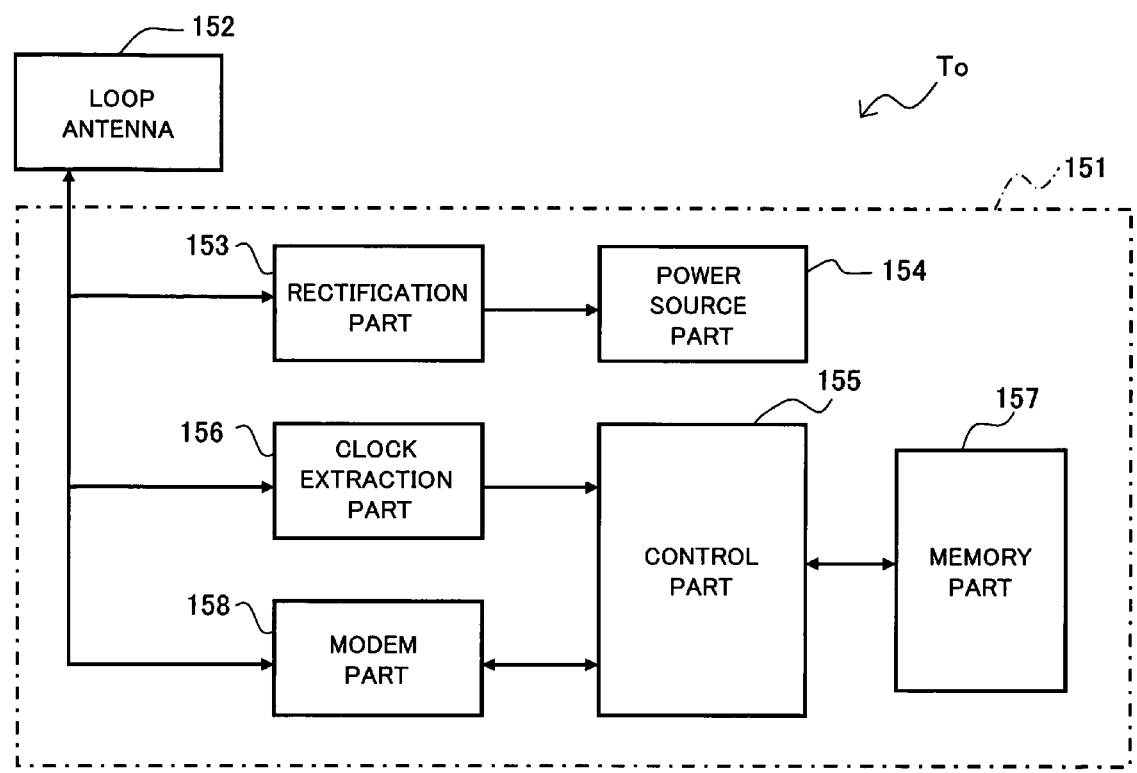

[FIG. 8A]
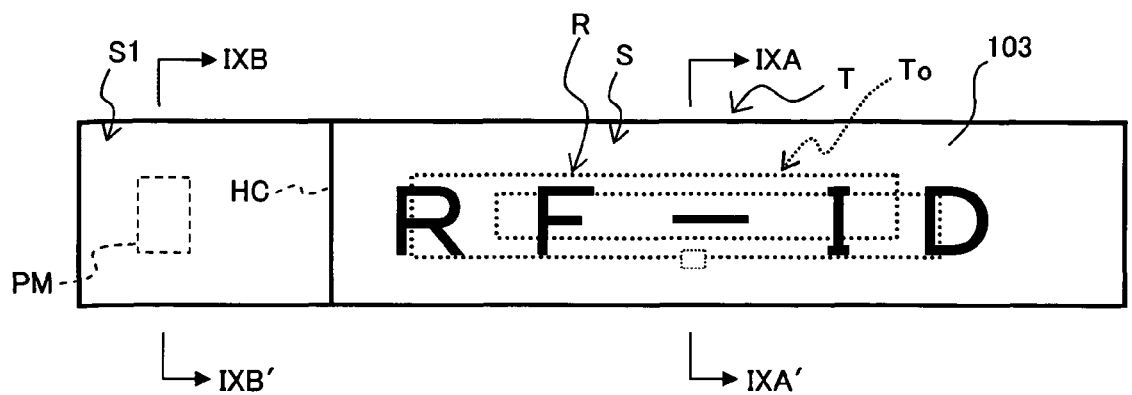
[FIG. 8B]
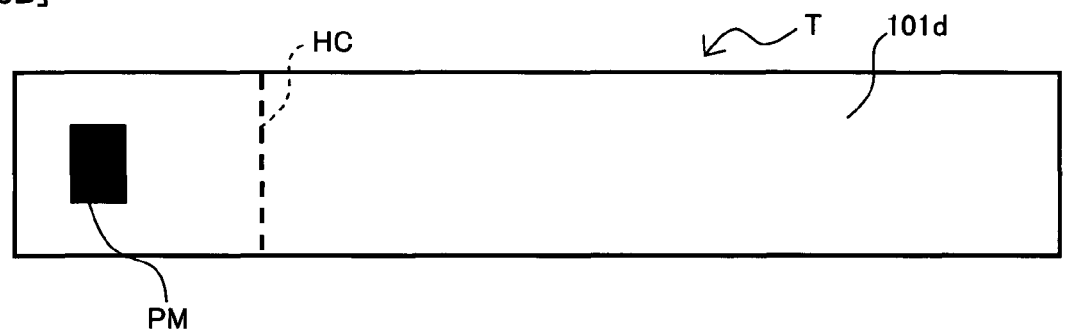

[FIG. 9A]
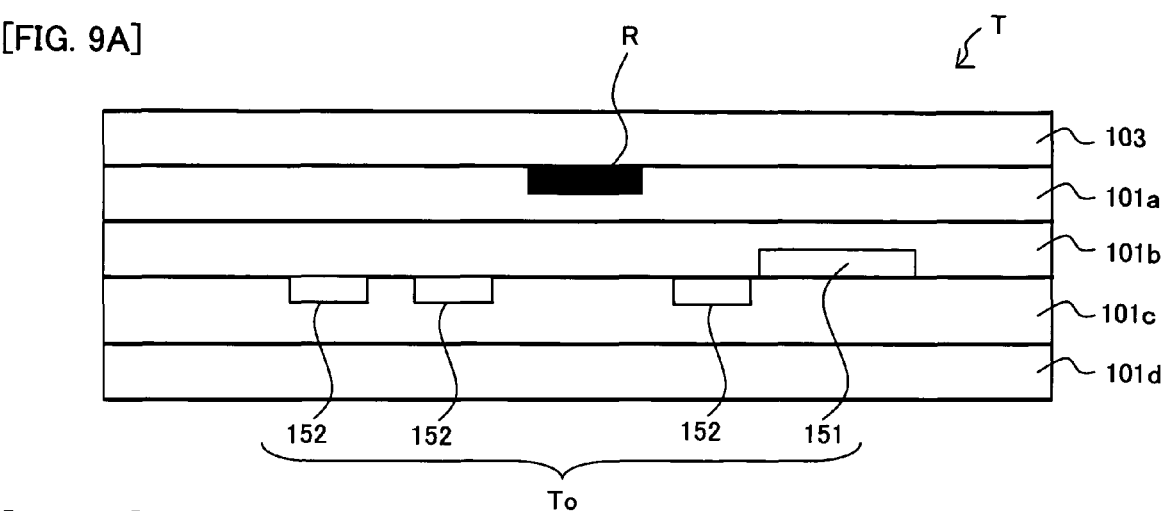
[FIG. 9B]
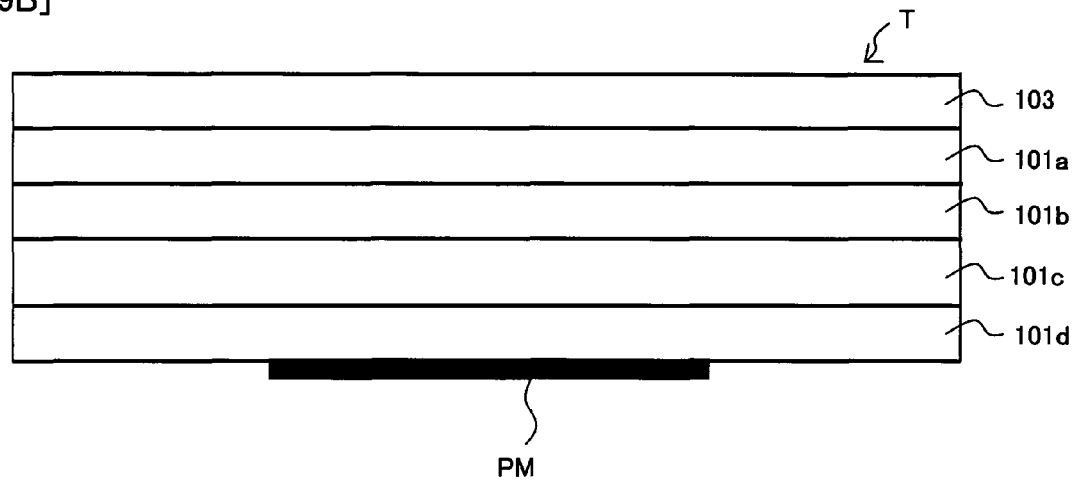

[FIG. 10]
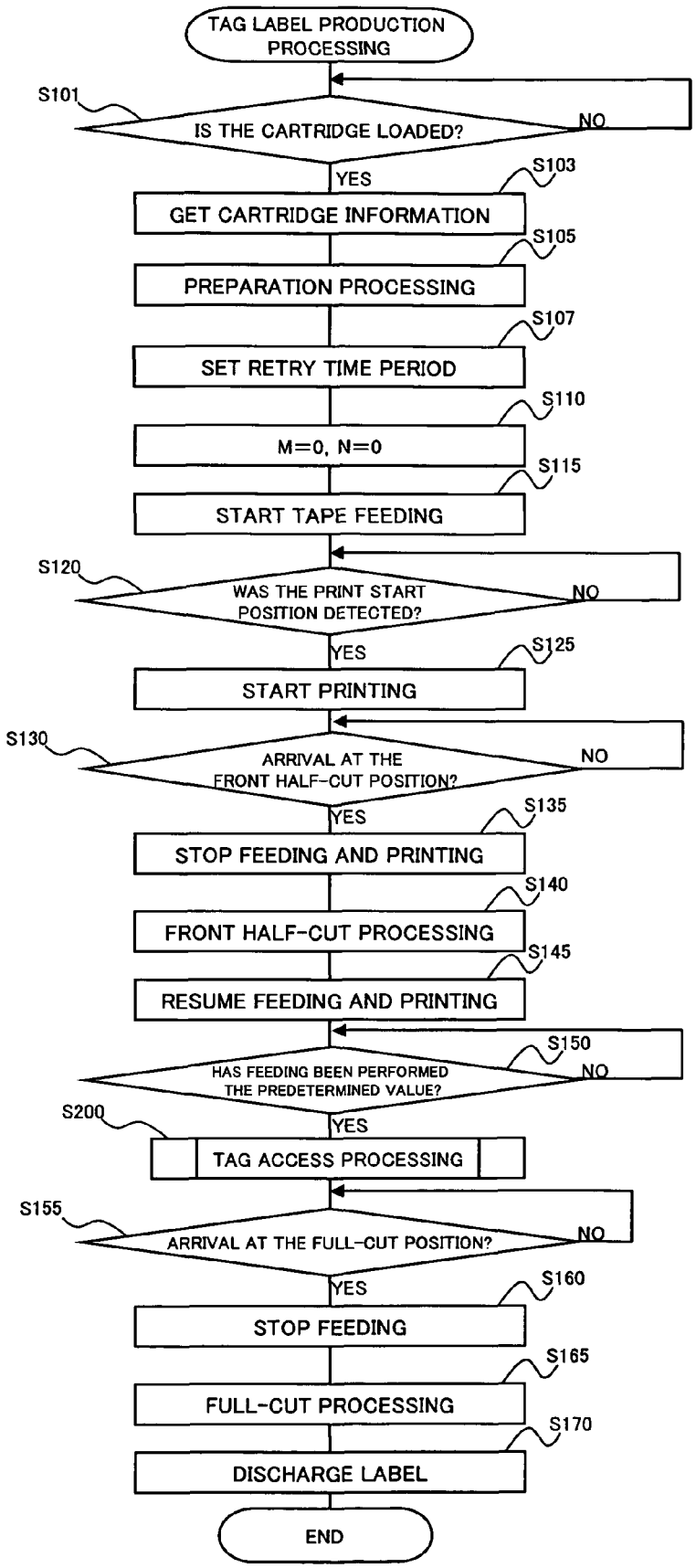

[FIG. 11]

RETRY TIME PERIOD

| TAPE WIDTH / FEEDING AMOUNT | 24mm | 36mm |
|---|---|---|
| 20mm | 15sec (10sec) | 20sec (15sec) |
| 40mm | 25sec (20sec) | 35sec (30sec) |

*VALUES INSIDE PARENTHESES INDICATE THE TIME REQUIRED FOR DISCHARGE.

[FIG. 12]
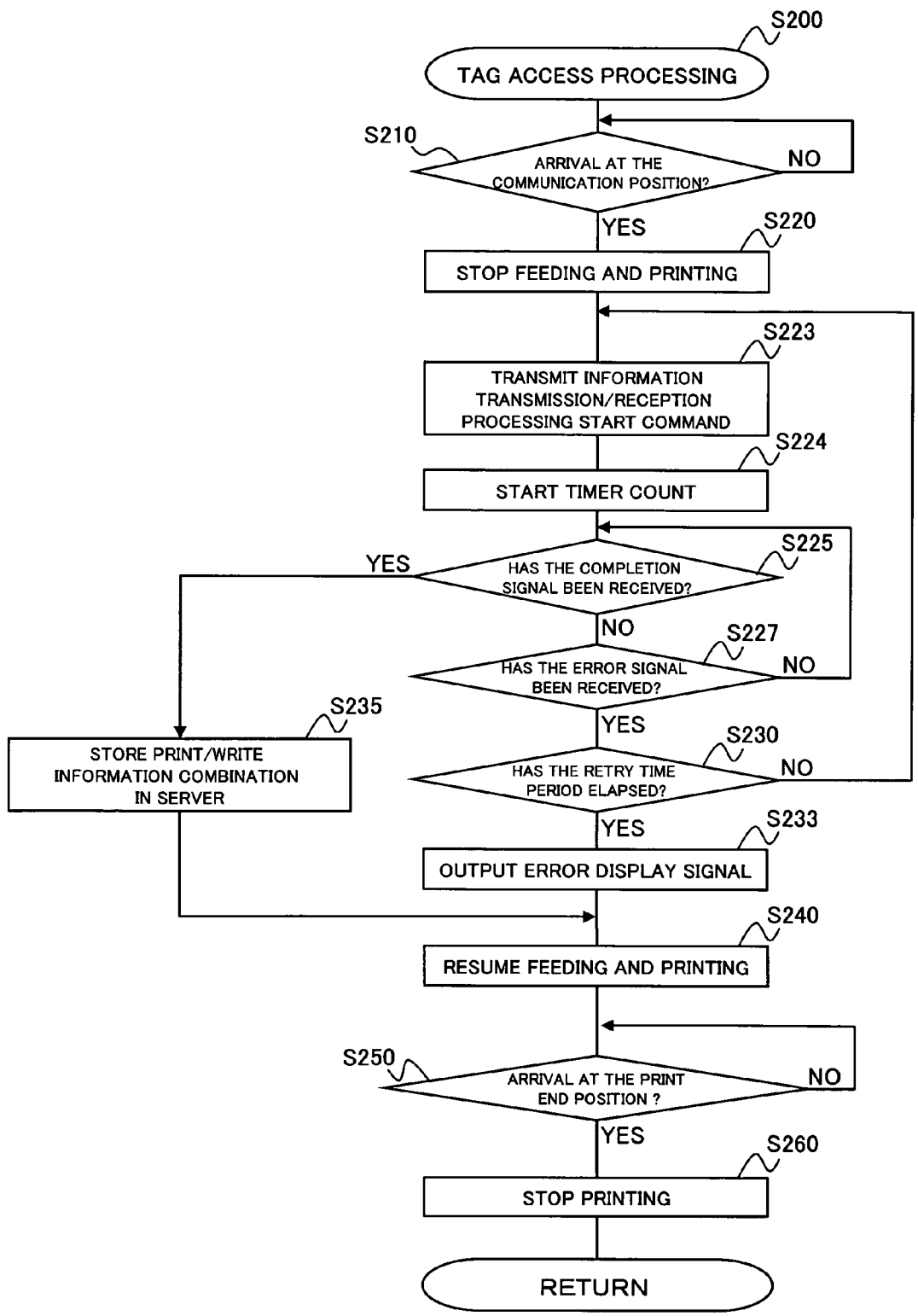

[FIG. 13]
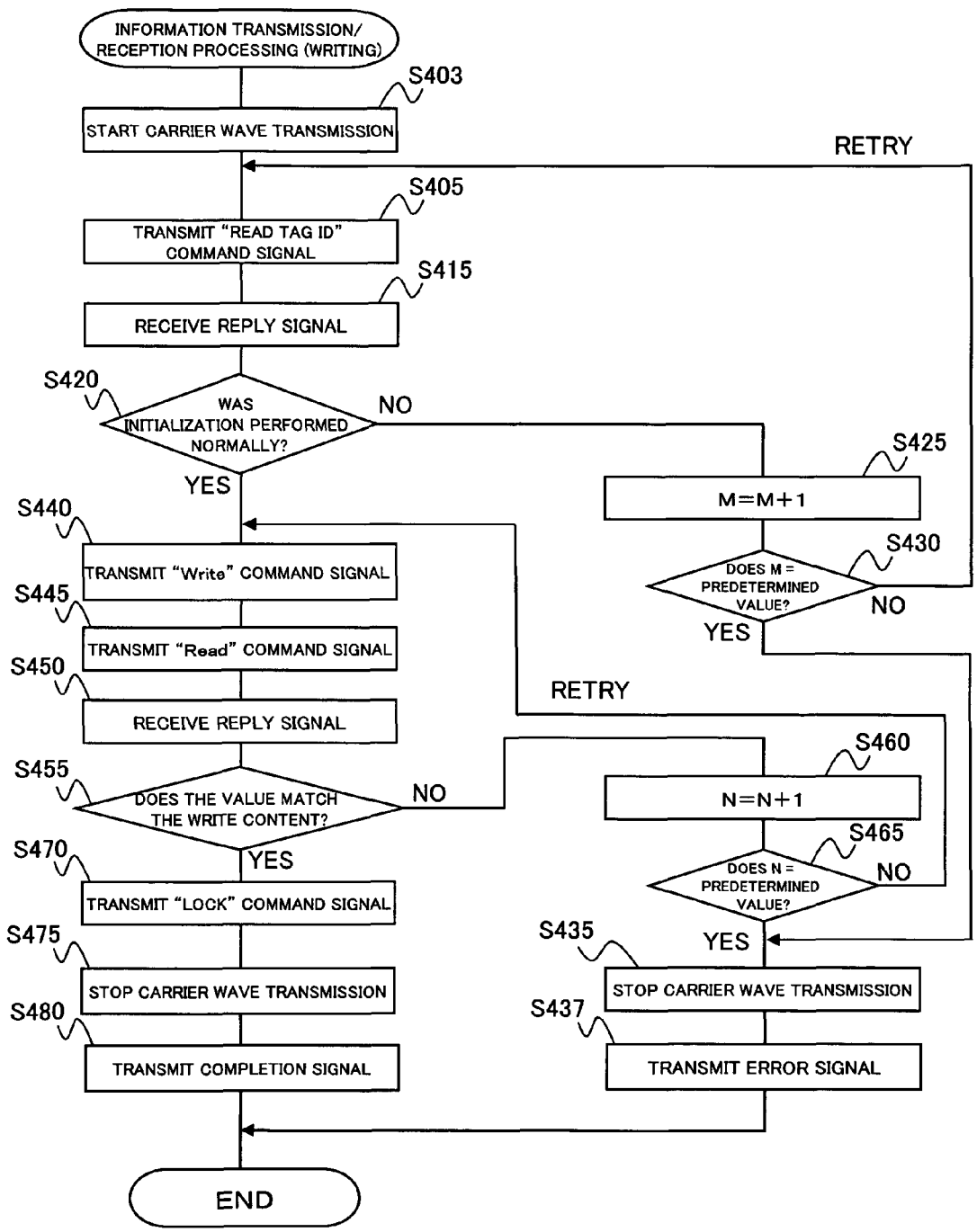

[FIG. 14]
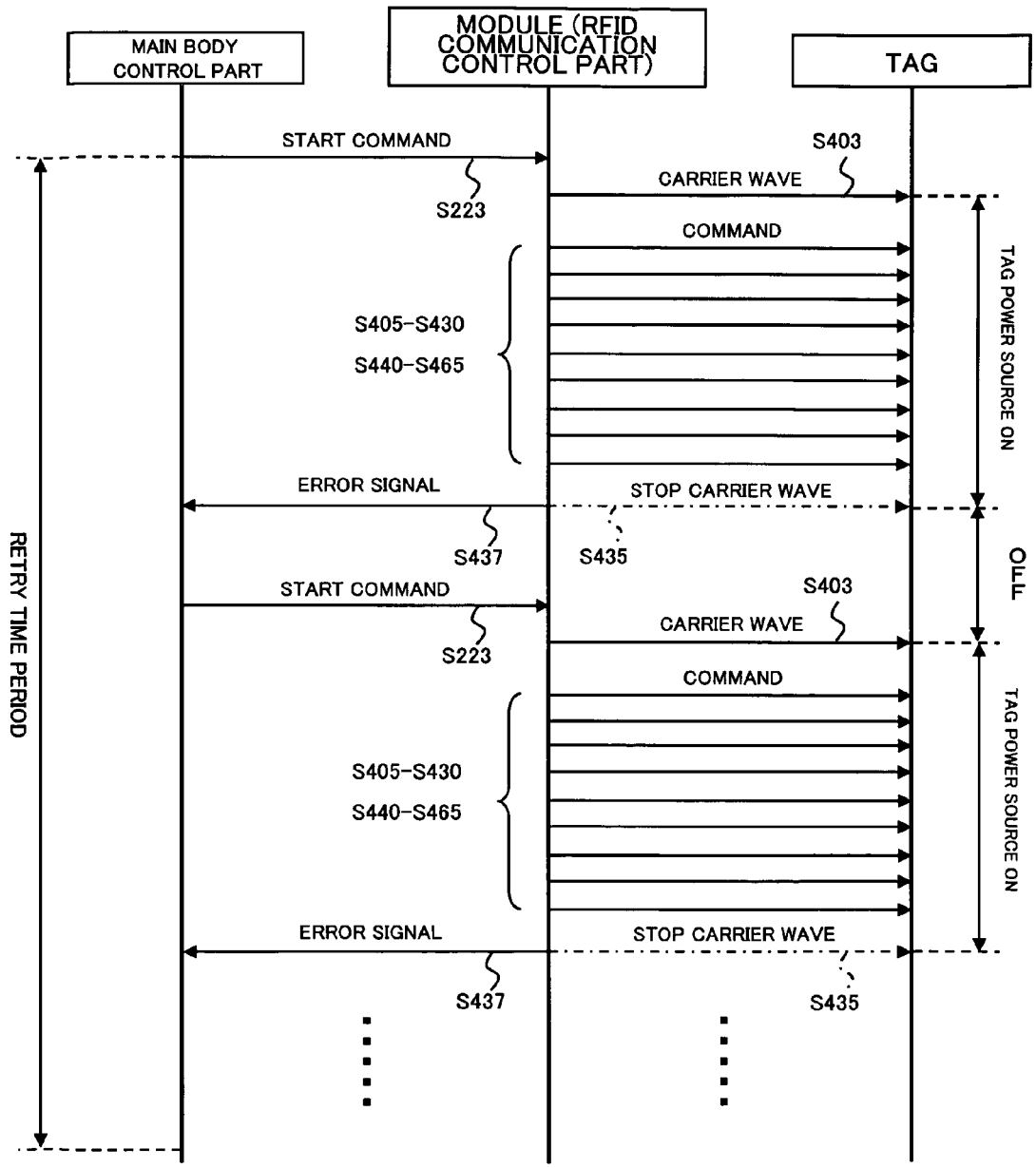

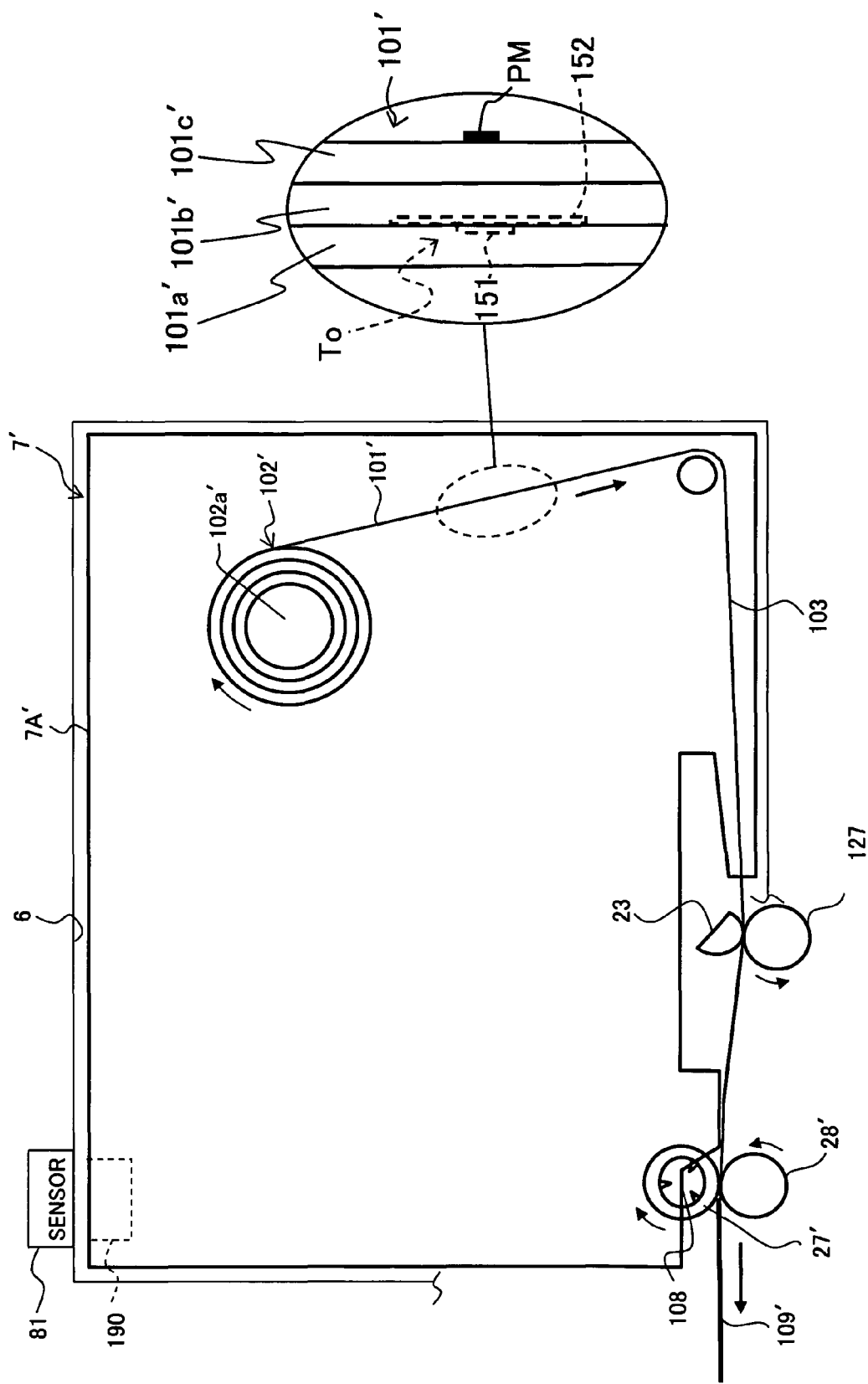

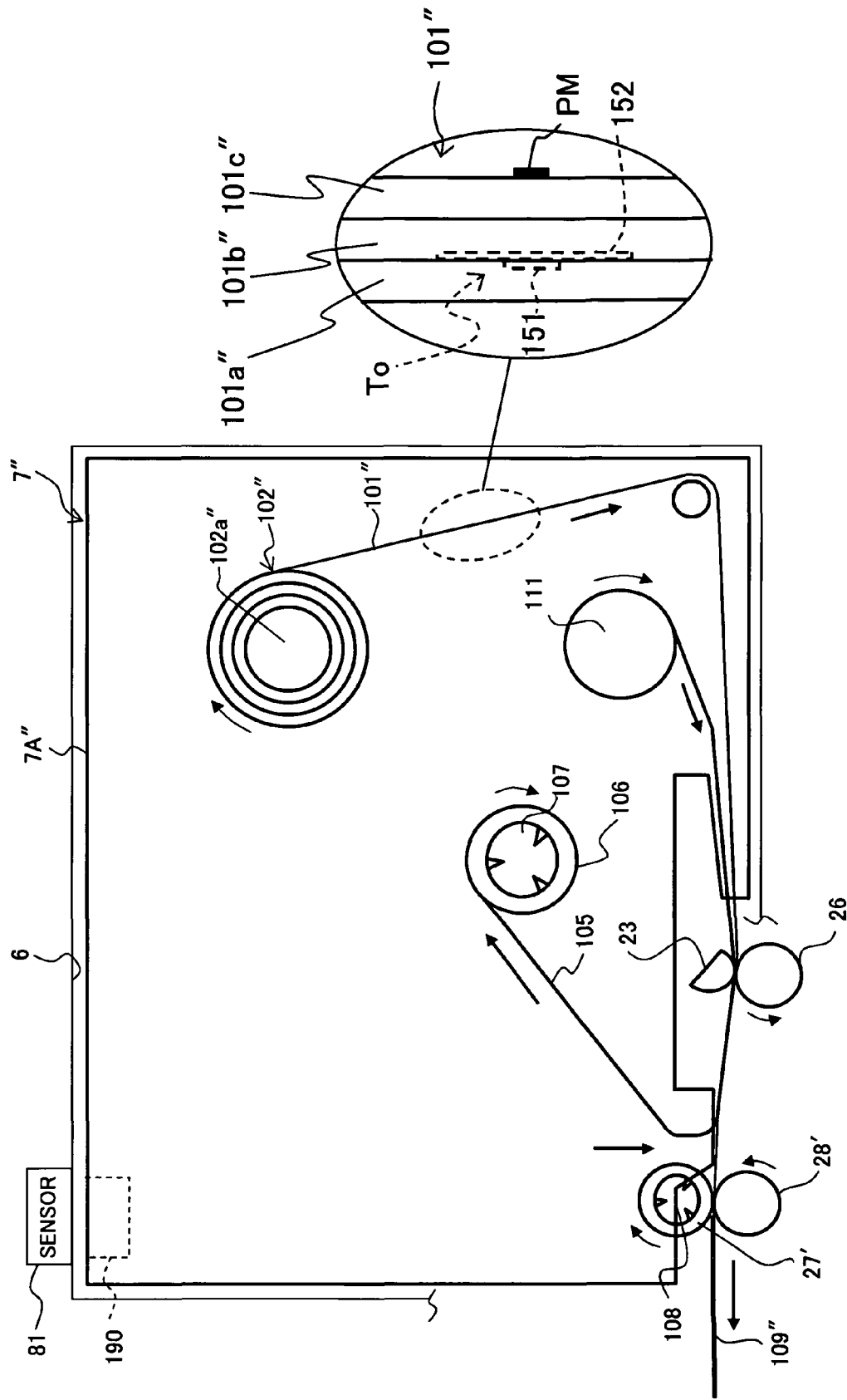
[FIG. 16]

RFID TAG INFORMATION COMMUNICATING APPARATUS

CROSS-REFERENCE TO RELATED APPLICATIONS

This application claims priority from JP 2007-201709, filed Aug. 2, 2007, and JP 2007-201710, filed Aug. 2, 2007, the contents of which are hereby incorporated by reference.

BACKGROUND

1. Field

The present disclosure relates to an RFID tag information communicating apparatus configured to transmit/receive information via wireless communication to/from an RFID circuit element comprising an IC circuit part configured to store information and a tag antenna configured to transmit/receive information.

2. Description of the Related Art

In recent years, RFID (Radio Frequency Identification) systems that perform reading/writing between a small-sized RFID tag having an RFID circuit element comprising an IC circuit part configured to store predetermined RFID tag information and a tag antenna that is connected to the IC circuit part so as to transmit/receive information, and a reader/writer (reading/writing apparatus) in a non-contact manner have been proposed and continually put to practical use in various fields.

One such RFID tag information communicating apparatus of prior art that performs information transmission/reception via wireless communication with the RFID circuit element is the apparatus described in JP, A, 2007-108893 (FIG. 11), for example. With this RFID tag information communicating apparatus (tag label producing apparatus) of prior art, a command signal ("Program" signal) for writing information to the RFID circuit element is transmitted to the RFID circuit element via an apparatus antenna device (an antenna) so as to write RFID tag information. Then, a command signal ("Verify" signal) for verifying whether or not writing was normally performed is transmitted to the RFID circuit element, and the corresponding decision is made based on a reply signal received from the RFID circuit element in response thereto. When writing has not been normally performed, the command signal is repeatedly transmitted a plurality of times until information writing succeeds.

Although not described in the above-described patent JP, A, 2007-108893, when information is to be written to the RFID circuit element, first, specifically, a command signal for information reading is transmitted to the RFID circuit element and, based on a reply signal received from the RFID element in response thereto, the identification information (tag ID) of the RFID circuit element is acquired. When information acquisition succeeds, a command signal for writing information using the acquired identification information is transmitted to the corresponding RFID circuit element. As a result, a command signal for information reading is repeatedly transmitted a plurality of times until identification information acquisition succeeds.

Here, within the RFID tag information communicating apparatus of the above prior art, static electricity may be produced for some reasons or other, such as the equipment material or member wear and tear, electrically charging the RFID circuit element during communication. In such a case, due the fluctuation in potential that arises within the RFID circuit element, the possibility exists that the RFID circuit element that received the command signal may not be able to transmit a reply signal normally. As a result, information reading from the RFID circuit element may fail even if the command signal is repeatedly transmitted a plurality of times.

Further, while the charge is gradually discharged when the cause of the electrical charging disappears and communication begins, the above-described fluctuation in potential within the RFID circuit element arises before the charge is sufficiently discharged. For this reason, as described above, the RFID circuit element that received the command signal may not be able to transmit a reply signal normally. That is, before the charge is sufficiently discharged, information reading from the RFID circuit element may fail even if the command signal is repeatedly transmitted a plurality of times. Furthermore, when information acquisition fails before the charge is sufficiently discharged in this way, perhaps due to RFID circuit element damage or failure, or perhaps due to the electrostatic charging, the soundness of the RFID circuit element cannot be determined.

SUMMARY

It is therefore an object of the present disclosure to provide an RFID tag information communicating apparatus capable of improving the probability of information reading from the RFID circuit element.

To achieve the above-described object, an aspect of the present application is an RFID tag information communicating apparatus comprising an apparatus antenna device that transmits/receives information via wireless communication to/from an RFID circuit element including an IC circuit part that stores information and a tag antenna that transmits/receives information; a command transmission portion that generates and transmits via the apparatus antenna device a command signal for reading information from the RFID circuit element; an information acquisition portion that attempts a reception of a reply signal transmitted from the RFID circuit element via the apparatus antenna device in response to the command signal so as to acquire information; and an electrostatic-safe communication control portion that controls at least the command transmission portion and repeatedly transmit a plurality of times the command signal to the RFID circuit element so that information substantially unaffected by static electricity is acquired by the information acquisition portion.

In the RFID tag information communicating apparatus of the aspect of the present disclosure, a command signal transmitted from command transmission portion is transmitted to the RFID circuit element via an apparatus antenna device. When the RFID circuit element received the command signal and transmits a reply signal in accordance with the command signal, the reply signal is received by the apparatus antenna device and the corresponding information is acquired by the information acquisition portion. At this time, the command signal is repeatedly transmitted a plurality of times by the electrostatic-safe communication control portion, until the information acquisition portion acquires information substantially unaffected by static electricity.

With this arrangement, even in a case where static electricity is produced within the RFID tag information communicating apparatus due to some reason or other, such as the equipment material or member wear and tear, causing the RFID circuit element to be electrically charged during communication, information acquisition by the information acquisition portion continues, thereby improving the probability of information reading from the RFID circuit element.

BRIEF DESCRIPTION OF THE DRAWING

FIG. 1 is a system configuration diagram which shows an RFID tag manufacturing system comprising an RFID tag information communicating apparatus according to the first embodiment of the present disclosure;

FIG. 2 is a perspective view which shows the overall general structure of the RFID tag information communicating apparatus;

FIG. 3 is a perspective view which shows the structure of the internal module within the RFID tag information communicating apparatus;

FIG. 4 is a plan view which shows the structure of the internal module;

FIG. 5 is an enlarged plan view schematically showing the detailed structure of a cartridge;

FIG. 6 is a functional block diagram which shows the control system of the RFID tag information communicating apparatus;

FIG. 7 is a functional block diagram which shows the functional configuration of an RFID circuit element;

FIG. 8 is a diagram which shows an example of the outer appearance of an RFID label formed after information is written to the RFID circuit element and the tag label tape with print is cut by the RFID tag information communicating apparatus; FIG. 8A is a top view, and FIG. 8B is a bottom view;

FIG. 9 is a diagram in which the cross-sectional view of the cross-section IXA-IXA' in FIG. 8 is rotated 90° C. in the counter-clockwise direction, and a diagram in which the cross-sectional view of the cross-section IXB-IXB' in FIG. 8 is rotated 90° C. in the counter-clockwise direction;

FIG. 10 is a flowchart which shows the detailed procedure performed by the main body control part when a tag label is produced;

FIG. 11 is a table which shows an example of the correlation between the tape width, the tape feeding amount, and the retry time period;

FIG. 12 is a flowchart which shows the detailed procedure of step S200;

FIG. 13 is a flowchart which shows the control procedure executed by the RFID communication control part of the module when a tag label is produced;

FIG. 14 is a diagram for explaining the signal exchange performed between the main body control part, the RFID communication control part of the module, and the RFID circuit element in tag access processing;

FIG. 15 is a plan view illustrating the detailed structure of the cartridge of a modification in a case where tape bonding is not performed; and FIG. 16 is a plan view illustrating the detailed structure of the cartridge of a modification in a case where tape bonding is not performed.

DETAILED DESCRIPTION OF THE PREFERRED EMBODIMENTS

The following describes the RFID tag information communicating apparatus according to a first embodiment of the present disclosure with reference to accompanying drawings. The present embodiment is an embodiment of a case where the present disclosure is applied to an RFID label manufacturing system.

In an RFID tag manufacturing system TS of the present embodiment shown in FIG. 1, an RFID tag information communicating apparatus 1 is connected to a route server RS, a plurality of information servers IS, a terminal 118a, and a general-purpose computer 118b via a communication line NW in a wired or wireless manner. The terminal 118a and the general-purpose computer 118b will hereinafter be suitably and simply referred to as a "PC 118" collectively.

As shown in FIG. 2, the RFID tag information communicating apparatus 1 produces RFID labels with print comprising an RFID circuit element within the apparatus, based on an operation performed from the PC 118. This RFID tag information communicating apparatus 1 comprises an apparatus main body 2 having a housing 200 of a substantially six-sided (substantially cubical) shape, and an opening/closing lid 3 provided on the upper surface of the apparatus main body 2 so as to freely open and close (or detach).

The housing 200 of the apparatus main body 2 comprises a front wall 10, which is positioned at the front of the apparatus (the left front side in FIG. 2) and comprises a label discharging exit 11 configured to discharge an RFID label T (described later) produced within the apparatus main body 2, and a front lid 12 with a rotationally supported bottom edge that is provided below the label discharging exit 11 of the front wall 10.

The front lid 12 comprises a pressing part 13, which is designed to release the front lid 12 forward when pressed upward. Further, on one edge of the front wall 10 is provided a power button 14 that turns the power source of the RFID tag information communicating apparatus 1 on and off. Below the power button 14 is provided a cutter driving button 16. The cutter driving button 16 is for driving a cutting mechanism 15 (refer to FIG. 3 described later) disposed within the apparatus main body 2 based on a manual operation of the operator. When this button 16 is pressed, a tag label tape 109 with print (refer to FIG. 4 described later) is cut at a desired length so as to form an RFID label T.

The opening/closing lid 3 is rotatably supported by a shaft at the edge of the right rear side in FIG. 2 of the apparatus main body 2, and is always biased in the release direction via a biasing member such as a spring, etc. Then, the opening/closing lid 3 and apparatus main body 2 are unlocked by the pressing of an open/close button 4 disposed adjacent to the opening/closing lid 3 on the upper surface of the apparatus main body 2, and released by the action of the biasing member. Furthermore, in the center side area of the opening/closing lid 3 is provided an inspection window 5 covered by a transparent cover.

An internal module 20 within the RFID tag information communicating apparatus 1 shown in FIG. 3 generally comprises a cartridge holder 6 configured to house a cartridge 7, a printing mechanism 21 comprising a print head (thermal head) 23, the cutting mechanism 15 comprising a fixed blade 40 and a movable blade 41, and a cutting module 35, which comprises a half-cutter 34 and is positioned downstream in the tape feeding direction from the fixed blade 40 and the movable blade 41.

On the upper surface of the cartridge 7 is provided a tape identifying display part 8 configured to display the tape width, tape color, etc., of a base tape 101 built within the cartridge 7, for example. On the cartridge holder 6, a roller holder 25 is rotatably pivoted by a support shaft 29 and is designed so as to be switchable to a print position (contact position; refer to FIG. 4 described later) or to a release position (break away position) by a switching mechanism. On this roller holder 25 are rotatably provided a platen roller 26 and a sub-roller 28. When the roller holder 25 switches to the print position, the platen roller 26 and the sub-roller 28 is pressed against the print head 23 and a feeding roller 27.

The print head 23 comprises a great number of heating elements, and is installed on a head installation part 24 established on the cartridge holder 6.

The cutting mechanism 15 comprises the fixed blade 40 and the movable blade 41 constructed using a metal material. The driving power of a cutter motor 43 (refer to FIG. 6 described later) is transmitted to a handle part 46 of the movable blade 41 via a cutter helical gear 42, a boss 50, and a long hole 49, causing the movable blade to rotate and perform cutting with the fixed blade 40. The switching status is detected by a micro switch 126 configured to switch based on the action of a cam 42A for the cutter helical gear.

The half-cutting module 35 is disposed opposite a receiving tray 38 and the half-cutter 34, and a first guide part 36 and a second guide part 37 are installed on a side plate 44 (refer to FIG. 4 described later) by a guide fixing part 36A. The half-cutter 34 is rotated by a rotating force of a half-cutter motor 129 (refer to FIG. 6 described later) around a predetermined rotating support point (not shown). On the edge of the receiving tray 38 is formed a receiving surface 38B.

FIG. 4 is a plan view illustrating the structure of the internal module 20 shown in FIG. 3. In FIG. 4, the cartridge holder 6 houses the cartridge 7 so that the orientation of the width direction of the tag label tape 109 with print discharged from a tape discharging part 30 of the cartridge 7 and further discharged from the discharging exit 11 is set in the vertical direction. Further, the internal module 20 is provided with a label discharging mechanism 22 and a loop antenna LC.

The loop antenna LC comprises a communicable area on the inner side of the housing 200, and is configured to receive and transmit information from and to an RFID circuit element To provided in the tag label tape 109 with print.

The label discharging mechanism 22 discharges the tag label tape 109 with print (in other words, an RFID label T; hereinafter the same) cut by the cutting mechanism 15 from the label discharging exit 11 (refer to FIG. 2). That is, the label discharging mechanism 22 comprises a driving roller 51 configured to rotate by the driving power of a tape discharging motor 123 (refer to FIG. 6 described later), a pressure roller 52 disposed opposite the driving roller 51 across from the tag label tape 109 with print, and a mark sensor 127 configured to detect an identification mark PM (refer to FIG. 5 described later) provided on the tag label tape 109 with print. At this time, on the inside of the label discharging exit 11 are provided first guide walls 55 and 56 and second guide walls 63 and 64 configured to guide the tag label tape 109 with print to the label discharging exit 11 and the loop antenna LC. The first guide walls 55 and 56 and the second guide walls 63 and 64 are each formed into an integrated unit and disposed so that they are separated at predetermined intervals at the discharging location of the tag label tape 109 with print (RFID label T) cut by the fixed blade 40 and the movable blade 41.

Furthermore, a feeding roller driving shaft 108 and a ribbon take-up roller driving shaft 107 provide feeding driving power to the tag label tape 109 with print and an ink ribbon 105 (described later), and are rotationally driven in coordination with each other.

FIG. 5 is an enlarged plan view schematically showing the detailed structure of the cartridge 7. In FIG. 5, the cartridge 7 comprises a housing 7A, a first roll 102 (actually spiral in shape, but simply shown in a concentric shape in the figure), around which the strip base tape 101 is wound, and which is disposed within the housing 7A, a second roll 104 (actually spiral in shape, but simply shown in a concentric shape in the figure), around which a transparent cover film 103 is wound, with approximately the same width as that of the base tape 101, a ribbon supply side roll 211 configured to supply the ink ribbon 105 (heat transfer ribbon, which is not required in a case of employing a thermal tape as the print-receiving tape), a ribbon take-up roller 106 configured to rewind the ribbon 105 after the printing, and the feeding roller 27 rotatably supported near the tape discharging part 30 of the cartridge 7.

The feeding roller 27 is configured to affix the base tape 101 and the cover film 103 to each other by applying pressure and transport the tag label tape 109 with print thus formed in the direction of the arrow A in FIG. 5 (i.e. functioning as a pressure roller as well).

The first roll 102 stores, in a manner such that it is wound around a reel member 102a, the base tape 101, which has a structure in which a plurality of RFID circuit elements To are serially formed at a predetermined interval along the longitudinal direction. In this example, the base tape 101 has a four-layer structure (refer to the partially enlarged view in FIG. 5) comprising an adhesive layer 101a formed of a suitable adhesive material, a colored base film 101b formed of PET (polyethylene terephthalate) or the like, an adhesive layer 101c formed of a suitable adhesive material, and a separation sheet 101d. The four layers of the base tape 101 are layered in that order from the side rolled to the inside (the right side in FIG. 5) to the side corresponding to the opposite side (the left side in FIG. 5).

A tag antenna 152 configured to transmit/receive information and constructed in a loop coil shape is provided on the back side of the base film 101b (on the left side in FIG. 5) in an integrated manner in this example, and an IC circuit part 151 configured to store information is formed so that it is connected to the tag antenna 152, thereby constructing an RFID circuit element To.

The adhesive layer 101a is formed on the front side of the base film 101b (on the right side in FIG. 5) for bonding the cover film 103 thereon at a later time. The separation sheet 101d is also bonded to the back side (on the left side of FIG. 5) of the base film 101b by the adhesive layer 101c for wrapping the RFID circuit element To therein.

Note that the separation sheet 101d is peeled off when the RFID label T is affixed as a finished label-shaped product to a predetermined article or the like, thereby affixing the RFID label T to the article or the like by the adhesive layer 101c. A predetermined identification mark (a black identification mark in this example; a hole punched in the base tape 101 by laser processing, etc., or a hole finished using a Thompson mold is also possible) PM for feeding control is provided in a predetermined location (a location further forward than the front end of the tag antenna 152 on the forward direction side of the feeding direction in this example) corresponding to each RFID circuit element To on the front surface of the separation sheet 101d.

The second roll 104 has the cover film 103 wound around a reel member 104a. The cover film 103 fed out from the second roll 104 is pressed against the ribbon 105 driven by the ribbon supply side roll 211 and the ribbon take-up roller 106, which are disposed inward from the back side of the cover film 103 (i.e., the side of the cover film 103 which is affixed to the base tape 101), by the print head 23, such that the ribbon 105 is brought into close contact with the back side of the cover film 103.

The ribbon take-up roller 106 and the feeding roller 27 are rotationally driven in coordination by a driving power of a feeding motor 119 (refer to FIG. 3 and FIG. 6 described later), which is a pulse motor, for example, provided on the outside of each cartridge, that is transmitted to the ribbon take-up roller driving shaft 107 and the tape feeding roller driving shaft 108 via a gear mechanism (not shown). The print head 23 is disposed upstream in the feeding direction of the cover film 103 from the feeding roller 27.

In the configuration described above, the base tape 101 fed out from the first roll 102 is supplied to the feeding roller 27.

The cover film 103 fed out from the second roll 104, in turn, is pressed against the ink ribbon 105 driven by the ribbon supply side roll 211 and the ribbon take-up roller 106, which are disposed inward from the back side of the cover film 103 (i.e., the side of the cover film 103 which is affixed to the base tape 101), by the print head 23, such that the ink ribbon 105 is brought into close contact with the back side of the cover film 103.

Then, when the cartridge 7 is loaded to the cartridge holder 6, and the roll holder 25 is moved from the release position to the print position, the cover film 103 and the ink ribbon 105 are sandwiched between the print head 23 and the platen roller 26, while the base tape 101 and the cover film 103 are sandwiched between the feeding roller 27 and the pressure roller 28. Subsequently, the ribbon take-up roller 106 and the feeding roller 27 are synchronously rotationally driven along the directions denoted by the arrow B and the arrow C, respectively, in FIG. 5 by the driving force provided from the feeding motor 119. Furthermore, the tape feeding roller driving shaft 108, the pressure roller 28, and the platen roller 26 are connected to one another by a gear mechanism (not shown). With such an arrangement, upon driving the tape feeding roller driving shaft 108, the feeding roller 27, the pressure roller 28, and the platen roller 26 rotate, thereby feeding out the base tape 101 from the first roll 102 to the feeding roller 27 as described above. On the other hand, the cover film 103 is fed out from the second roll 104, and a plurality of heating elements of the print head 23 are powered by a print-head driving circuit 120 (refer to FIG. 6 described later). As a result, printing is performed, thereby forming the print R (refer to FIG. 8 described later), which corresponds to the RFID circuit element To on the base tape 101 that is to be bonded, on the back side of the cover film 103. Then, the base tape 101 and the printed cover film 103 are affixed to each other by the feeding roller 27 and the pressure roller 28 so as to form a single tape, thereby forming the tag label tape 109 with print, which is then transported to outside the cartridge 7 by the tape discharging part 30 (refer to FIG. 4). Subsequently, the ribbon take-up roller driving shaft 107 is driven to take up the ink ribbon 105, which has been used to print the print on the cover film 103, onto the ribbon take-up roller 106.

The housing 7A of the cartridge 7 comprises a detected part 190 (an identifier of a bumpy shape, for example), and a cartridge sensor 81 is provided at the location corresponding to the detected part 190 of the cartridge holder 6. This cartridge sensor 81 detects the loaded state of the cartridge 7 and the cartridge information related to the type of the cartridge 7. The detection signal of the cartridge sensor 81 is inputted to a control part 110 (refer to FIG. 6 described later), thereby enabling the control part 110 to acquire the loaded state of the cartridge 7 and the cartridge information. Furthermore, the cartridge information includes information such as whether or not the cartridge 7 is a cartridge for producing an RFID label T having an RFID circuit element To, the disposed interval of the RFID circuit element To within the base tape 101 when the RFID label T has an RFID circuit element To, the tape width, and the tape type (the so-called laminated type that affixes the cover film 103 or another type).

For the cartridge sensor 81, a sensor that performs mechanical detection such as a mechanical switch, a sensor that performs optical detection, or a sensor that performs magnetic detection may be used, or a sensor that has a reader function so as to read the RFID tag information via wireless communication from the RFID circuit element for the cartridge installed in the housing 7A of the cartridge 7 may be used.

Then, after the information of the tag label tape 109 with print bonded and produced as described above is read from or written to the RFID circuit element To by the loop antenna LC, the tag label tape 109 with print is cut by the cutting mechanism 15 either automatically or by operating the cutter driving button 16 (refer to FIG. 2), thereby forming the RFID label T. This RFID label T is subsequently discharged from the label discharging exit 11 (refer to FIG. 2 and FIG. 4) by the label discharging mechanism 22.

FIG. 6 shows a control system of the RFID tag information communicating apparatus 1 of the present embodiment. Note that the arrow shown in the figure denotes an example of signal flow, but the signal flow direction is not limited thereto.

In FIG. 6, the main body control part 110 and a module 300 are disposed on a control board (not shown) of the RFID tag information communicating apparatus 1.

The main body control part 110 is provided with a CPU 111 configured to control each device, an input/output interface 113 connected to the CPU 111 via a data bus 112, a CG ROM 114, ROMs 115 and 116, a RAM 117, and a timer 86, and the module 300 is provided with an RFID communication control part 305, a transmission circuit 306, a reception circuit 307, and an antenna sharing device 240.

The ROM 116 stores a print-head driving control program configured to read print buffer data in accordance with an operation input signal from the PC 118 so as to drive the print head 23, the feeding motor 119, and a tape discharging motor 65; a cutter driving control program configured to drive the cutter motor 43 so as to cut the tag label tape 109 with print; a tape discharging program configured to drive the tape discharging motor 65 so as to forcibly discharge the cut tag label tape 109 with print (i.e., the RFID label T) from the label discharging exit 11; a transmission program configured to generate and output to a transmission circuit access information such as an inquiry signal or write signal for the RFID circuit element To; a reception program configured to process reply signals and the like inputted from a reception circuit; and various other programs required for controlling of the RFID tag information communicating apparatus 1. The CPU 111 performs various operations based on each such program stored in the ROM 116.

The RAM 117 is provided with a text memory 117A, a print buffer 117B, a parameter storage area 11 7E, and the like. The text memory 11 7A stores document data inputted from the PC 118. The print buffer 117B stores a plurality of dot patterns for printing letters and symbols as well as the number of applied pulses, i.e., the amount of energy for forming each dot, as dot pattern data, and the print head 23 performs dot printing according to the dot pattern data stored in the print buffer 117B. The parameter storage area 117E stores information such as various operation data and the (previously described) read (acquired) tag identification information (UID) of the RFID circuit element To.

The timer 86 starts counting based on a "Start" command outputted from the CPU 111, and later outputs time information to the CPU 111 via the data bus 112. The CPU 111 judges whether or not the retry time period has elapsed using this time information (details described later).

The input/output interface 113 is connected to the PC 118, the print-head driving circuit 120 for driving the print head 23, a feeding motor driving circuit 121 for driving the feeding motor 119, a cutter motor driving circuit 122 for driving the cutter motor 43, a half-cutter motor driving circuit 128 for driving the half-cutter motor 129, the tape discharging motor driving circuit 123 for driving the tape discharging motor 65, the mark sensor 127 configured to detect the identification mark PM, the cartridge sensor 81 configured to detect the loaded state of the cartridge 7, and the cutter driving button 16.

The module 300 comprises the transmission circuit 306 configured to generate a carrier wave for accessing (reading from/writing to) the RFID circuit element To via the loop antenna LC and modulate the carrier wave based on a control signal inputted from the RFID communication control part 305 so as to output an interrogation wave, the reception circuit 307 configured to demodulate and output to the RFID communication control part 305 a reply wave (reply signal) received from the RFID circuit element To via the loop antenna LC, the RFID communication control part 305 configured to control the transmission/reception circuits 306 and 307 based on a control signal inputted from the main body control part 110, and the antenna sharing device 240 that connects the transmission circuit 306 and the reception circuit 307 to the loop antenna LC.

While information is transmitted and received here using a single antenna, i.e., the antenna sharing device 240, the present disclosure is not limited thereto, and two antennas may provided correspondingly to the transmission circuit 306 and the reception circuit 307.

In such a control system with the main body control part 110 at its core, when character data and the like are inputted via the PC 118, the text (document data) is successively stored in the text memory 117A, the print head 23 is driven via the driving circuit 120, and each heating element is selectively exothermically driven according to the print dots of one line so as to print the dot pattern data stored in the print buffer 117B, while the feeding motor 119 synchronously controls the feeding of the tape via the driving circuit 121. Further the RFID communication control part 305 of the module 300 controls the modulation of the carrier wave so as to output an interrogation wave from the loop antenna LC to the transmission circuit 306 based on a control signal from the main body control part 110, and demodulates a reply wave received from the RFID circuit element To so as to process the acquired signal in the reception circuit 307.

FIG. 7 shows the functional configuration of the RFID circuit element To. Note that the arrow shown in the figure denotes an example of signal flow, but the signal flow direction is not limited thereto.

In FIG. 7, the RFID circuit element To comprises the loop antenna 152 configured to transmit/receive signals in a non-contact manner by magnetic induction with the loop antenna LC of the RFID tag information communicating apparatus 1, and the IC circuit part 151 connected to the loop antenna 152.

The IC circuit part 151 comprises a rectification part 153 configured to rectify the interrogation wave received via the loop antenna 152, a power source part 154 configured to store the energy of the interrogation wave thus rectified by the rectification part 153 as a driving power source, a clock extraction part 156 configured to extract a clock signal from the interrogation wave thus received from the loop antenna 152 and supply the clock signal thus extracted to a control part 155, a memory part 157 configured to store a predetermined information signal, a modem part 158 connected to the loop antenna 152, and the control part 155 for controlling the operation of the RFID circuit element To via the rectification part 153, the clock extraction part 156, the modem part 158, etc.

The modem part 158 demodulates communication signals from the loop antenna LC of the RFID tag information communicating apparatus 1 received from the loop antenna 152, modulates a reply signal from the control part 155, and transmits a reply wave from the loop antenna 152.

The control part 155 executes basic control, such as interpreting a received signal demodulated by the modem part 158, generating a reply signal based on the information signal stored in the memory part 157, and returning the reply signal from the modem part 158.

The clock extraction part 156 extracts the clock component from the received signal, and supplies the clock corresponding to the frequency wave of the clock component thus extracted to the control part 155.

FIG. 8 and FIG. 9 show an example of the outer appearance and cross-section of an RFID label T formed after completion of information writing to the RFID circuit element To and the cutting of the tag label tape 109 with print.

In these FIGS. 8 and 9, the RFID label T has a five-layer structure in which the cover film 103 is added to the four-layer structure illustrated in FIG. 5. The five layers are comprised of the cover film 103, the adhesive layer 101a, the base film 101b, the adhesive layer 101c, and the separation sheet 101d, which are laminated from the cover film 103 (upper side in FIG. 9) to the opposite side (lower side in FIG. 9). Furthermore, the RFID circuit element To, including the loop antenna 152 provided on the back side of the base film 101b as described above, is provided within the base film 101b and the adhesive layer 101c, and the label print R (in the example, the text "RF-ID" which indicates the type of RFID label T) corresponding to the stored information, etc., of the RFID circuit element To is printed on the back face of the cover film 103.

On the cover film 103, the adhesive layer 101a, the base film 101b, and the adhesive layer 101c is formed a half-cutting line HC substantially along the tape width direction by the half-cutter 34 previously described. The area of the cover film 103 that is on the rear end side in the tape longitudinal direction of the half-cutting line HC (the right side in FIG. 8) is a print area S in which the label print R is printed, and the area of the cover film 103 that is on the front end side in the tape longitudinal direction (the left side in FIG. 8) across the half-cutting line HC from the print area S is a front margin area S1.

In the RFID tag information communicating apparatus 1 having a basic configuration such as described above, the base tape 101 comprising the RFID circuit element To is fed by the feeding roller 27 and information transmission/reception is performed with the RFID circuit element To via the loop antenna LC so as to form the RFID label T. At this time, in the present embodiment, when information transmission/reception is performed, the transmission of a command signal to the RFID circuit element To by the transmission circuit 306 is repeated until the acquisition of information by the RFID communication control part 305 of the module 300 succeeds, and the RFID communication control part 305 of the module 300 is controlled in coordination by the main body control part 110 so that an operation in which the transmission of a carrier wave by the transmission circuit 306 is paused and later resumed is included within the repetition of transmissions.

To execute the above control, the procedure shown in FIG. 10 is executed by the main body control part 110. Note that the flow of FIG. 10 is started when, for example, the operator enters a label production command from the PC 118 to the RFID tag information communicating apparatus 1.

First, in step S101, the decision is made as to whether or not the cartridge 7 is loaded to the cartridge holder 6, based on a detection signal from the cartridge sensor 81. This step is repeated until the cartridge 7 is loaded and, once the cartridge 7 is loaded, the decision is made that the condition is satisfied and the flow proceeds to the next step S103.

In step S103, the cartridge information related to the loaded cartridge 7 is acquired based on a detection signal from the cartridge sensor 81. This cartridge information, as previously described, includes information such as whether or not the cartridge 7 is a cartridge for producing an RFID label T having an RFID circuit element To, the disposed interval of the RFID circuit element To, the tape width, and the tape type.

In the next step S105, preparation processing wherein the print data, print length, RFID circuit element To communication data (write data), and front/rear half-cut position and full-cut position settings are set is executed based on an operation signal from the PC 118. The information required for this preparation processing is entered and edited from the PC 118, thereby improving operator convenience.

In the next step S107, the retry time period is set based on the cartridge information acquired in the step S103 and the information set in the step S105. This retry time period is the maximum time period that the command signal is repeatedly transmitted from the module 300 to the RFID circuit element To when there is no response from the RFID circuit element To when communication is performed from the loop antenna LC to the RFID circuit element To, prohibiting transmission of the command signal to the RFID circuit element To after this retry time period has elapsed. In the present embodiment, the correlation information of the tape width, tape feeding amount, and retry time period is stored in advance in a suitable memory (the RAM 117, etc.; refer to FIG. 11 described later), and the retry time period is set based on this information, according to the tape width in the cartridge information and the print length set in the step S105 (or the tape feeding amount based thereon).

Next, in step S110, in a case where there is no response from the RFID circuit element To when communication is performed from the loop antenna LC to the RFID circuit element To, variables M and N for counting the number of communication reattempts (retries) are initialized to 0 (refer to FIG. 13 described later).

Subsequently, the flow proceeds to step S115, where a control signal is outputted to the feeding motor driving circuit 121 via the input/output interface 113, and the feeding roller 27 and the ribbon take-up roller 106 are rotationally driven by the driving force of the feeding motor 119. Furthermore, a control signal is outputted to the tape discharging motor 65 via the tape discharging motor driving circuit 123, and the driving roller 51 is rotationally driven. With this arrangement, the base tape 101 is fed out from the first roll 102 and supplied to the feeding roller 27, the cover film 103 is fed out from the second roll 104, and the base tape 101 and the cover film 103 are affixed to each other by the feeding roller 27 and the sub-roller 28 so as to form a single tape, thereby forming the tag label tape 109 with print, which is then transported.

Next, in step S120, the decision is made as to whether or not the identifier PM of the base tape 101 has been detected (in other words, whether or not the cover film 103 has reached the print start position of the print head 23), based on the detection signal of the mark detection sensor 127 inputted via the input/output interface 113. This step is repeated until the identifier PM is detected and, once the identifier PM is detected, the decision is made that the condition is satisfied, and the flow proceeds to the next step S125.

In step S125, a control signal is outputted to the print-head driving circuit 120 via the input/output interface 113 so as to supply power to the print head 23 and start the printing of the label print R such as letters, symbols, barcodes, or the like, corresponding to the print data generated in step S105 in the above-described print area S of the cover film 103 (the area to be substantially bonded to the back face of the RFID circuit element To disposed at an equal interval at a predetermined pitch in the base tape 101).

Subsequently, in step S130, the decision is made as to whether or not the tag label tape 109 with print has been fed to the front half-cut position set in the previous step S105 (in other words, whether or not the tag label tape 109 with print has reached the position where the half-cutter 34 of the half-cutting mechanism 35 is in front of the front half-cut line HCl). This decision may be made by detecting, for example, the transported distance after the identifier PM of the base tape 101 has been detected in the step S120, using a predetermined known method (by counting, for example, the number of pulses outputted by the feeding motor driving circuit 121 configured to drive the feeding motor 119, which is a pulse motor).

This step is repeated until the tag label tape 109 with print reaches the front half-cut position and, once the tag label tape 109 with print reaches the front half-cut position, the decision is made that the condition has been satisfied in step S130, and the flow proceeds to the next step S135.

In step S135, a control signal is outputted to the feeding motor driving circuit 121 and the tape discharging motor driving circuit 123 via the input/output interface 113 so as to stop the driving of the feeding motor 119 and the tape discharging motor 65, thereby stopping the rotation of the feeding roller 27, the ribbon take-up roller 106, and the driving roller 51. With this arrangement, in the process wherein the tag label tape 109 with print fed out from the cartridge 7 is moved in the discharging direction, the feed-out of the base tape 101 from the first roll 102, the feed-out of the cover film 103 from the second roll 104, and the transport of the tag label tape 109 with print are stopped with the half-cutter 34 of the half-cutting mechanism 35 in front of the front half-cut line HCl set in step S105. At this time, a control signal is also outputted to the print-head driving circuit 120 via the input/output interface 113 so as to stop the power supply to the print head 23, thereby stopping (interrupting) the printing of the above-described label print R.

Next, in step S140, a control signal is outputted to the half-cutter motor driving circuit 128 via the input/output interface 113 so as to drive the half-cutter motor 129 and rotate the half-cutter 34, thereby cutting the cover film 103, the adhesive layer 101a, the base film 101b, and the adhesive layer 101c of the tag label tape 109 with print and perform the front half-cut processing which forms the front half-cut line HCl.

Then, the flow proceeds to step S145 and, similar to the step S115, the feeding roller 27, the ribbon take-up roller 106, and the driving roller 51 are rotationally driven so as to resume the transport of the tag label tape 109 with print, and, similar to step S125, power is supplied to the print head 23 so as to resume the printing of the label print R.

Subsequently, in step S150, the decision is made as to whether or not the tag label tape 109 with print to be fed has been transported a predetermined value (for example, a transport distance long enough for a corresponding RFID circuit element To, to which the printed cover film 103 has been bonded, to reach the loop antenna LC). The transport distance decision at this time, similar to the step S130, may also be made by counting the pulse count outputted to the feeding motor driving circuit 121 configured to drive the feeding motor 119, which is a pulse motor.

This step is repeated until the tag label tape 109 with print has been transported the predetermined distance and, once the tag label tape 109 with print has been transported the predetermined distance, the decision is made that the condition is satisfied in step S150, and the flow proceeds to the next step S200.

In the next step S200, tag access processing is performed. That is, when feeding is performed to the communication position of the RFID circuit element To (the position where the RFID circuit element To is substantially in front of the loop antenna LC), the feeding and printing are stopped so as to perform information transmission and reception, and then feeding and printing are resumed so as to complete printing (refer to FIG. 12 described later).

When step S200 is completed as described above, the flow proceeds to step S155 (at this moment, the transport of the tag label tape 109 with print is resumed in step S200). In step S155, the decision is made as to whether or not the tag label tape 109 with print has been fed to the above-described full-cut position (in other words, whether or not the tag label tape 109 with print has reached the position where the movable blade 41 of the cutting mechanism 15 is in front of the full-cut position set in step S105). This decision may also be made by detecting, for example, the transported distance after the identifier PM of the base tape 101 has been detected in the step S120, using a predetermined known method (by counting, for example, the number of pulses outputted by the feeding motor driving circuit 121 configured to drive the feeding motor 119, which is a pulse motor) as described above. Until the full-cut position is reached, the decision is made that the condition is not satisfied and this step is repeated. Once the position has been reached, the decision is made that the condition is satisfied, and the flow proceeds to the next step S160.

In step S160, similar to the step S135, the rotation of the feeding roller 27, the ribbon take-up roller 106, and the driving roller 51 are stopped, thereby stopping the transport of the tag label tape 109 with print. With this arrangement, the feed-out of the base tape 101 from the first roll 102, the feed-out of the cover film 103 from the second roll 104, and the transport of the tag label tape 109 with print are stopped with the movable blade 41 of the cutting mechanism 15 in front of the full-cut position set in step S105.

Subsequently, in step S165, a control signal is outputted to the cutter motor driving circuit 122 so as to drive the cutter motor 43 and rotate the movable blade 41 of the cutting mechanism 15, thereby performing the full-cut processing wherein the cover film 103, the adhesive layer 101a, the base film 101b, the adhesive layer 101c, and the separation sheet 101d of the tag label tape 109 with print are all cut to form the cutting line. Thus, a label-shaped RFID label T, which includes the RFID circuit element To to which the RFID tag information has been written, and on which desired printing has been performed correspondingly thereto, is formed by cutting the RFID label T from the tag label tape 109 with print by the separation action executed by the cutting mechanism 15.

Subsequently, the flow proceeds to step S170 where a control signal is outputted to the tape discharging motor driving circuit 123 via the input/output interface 113 so as to drive the tape discharging motor 65 again, thereby rotating the driving roller 51. As a result, the driving roller 51 begins transport once again. Accordingly, the RFID label T thus formed in the shape of a label in the step S165 is transported toward the label discharging exit 11 and discharged to outside the apparatus from the label discharging exit 11, and the flow ends.

The present disclosure is not limited to the procedure indicated in the above flow. Steps may be added or removed or the order of the steps may be changed without departing from the spirit and scope of the present disclosure.

FIG. 11 shows an example of the correlation between the tape width, the tape feeding amount, and the retry time period.

In FIG. 11, the feeding amount is the feeding amount of the tape (the base tape 101, the cover film 103, and the tag label tape 109 with print) set based on the print length of the print data inputted from the PC 118, and the tape width is the tape width information included in the cartridge information. Generally, because the electrical charge increases as the tape feeding amount and tape width increase, the time required for discharge increases as the tape feeding amount and tape width increase, as shown in the figure. Then, each retry time period is respectively set so that the period is longer by a predetermined margin than the time period required for each discharge. With this arrangement, during the time period of the margin after the time required for discharge has elapsed, command transmission is repeatedly performed after sufficient electrostatic discharge, thereby improving the probability of wireless communication success and preventing the energy loss that results when useless communication continues after the retry time period has elapsed.

While the correlation information is established here based on combinations of feeding amounts and tape width classifications of two types each so as to simplify the explanation, the correlation information may also be established based on more detailed classifications. Further, the parameters that make up the correlations are not limited to the feeding amount and tape width; the retry time period may be set using other information as well, such as, for example, the print length, feeding time, tape type (the so-called laminated type that affixes the cover film 103 or the other so-called non-laminated type, such as a thermal type), etc.

FIG. 12 shows the detailed procedure of the step S200.

First, in step S210, the decision is made as to whether or not the tag label tape 109 with print has been transported to the position of communication with the loop antenna LC. The decision at this time as well, similar to the step S130 of the FIG. 10, may be made by detecting, for example, the transported distance after the identifier PM of the base tape 101 has been detected in the step S120, using a predetermined known method.

This step is repeated until the tag label tape 109 with print reaches the communication position and, once the tag label tape 109 with print has reached the communication position, the decision is made that the condition has been satisfied in step S210, and the flow proceeds to the next step S220.

In step S220, similar to the step S135, the rotation of the feeding roller 27, the ribbon take-up roller 106, and the driving roller 51 are stopped, thereby stopping the transport of the tag label tape 109 with print, with the loop antenna LC substantially in front of the RFID circuit element To. Also, the power supply to the print head 23 is stopped so as to stop (pause) the printing of the label print R.

Next, in step S223, an information transmission/reception processing start command configured to provide instructions so that information transmission/reception processing (refer to FIG. 13 described later for details) wherein information is transmitted/received via wireless communication between the loop antenna LC and the RFID circuit element To so as to write the information created in the step S105 to the IC circuit part 151 of the RFID circuit element To (or read the information stored in advance in the IC circuit part 151) is transmitted to the RFID communication control part 305 of the module 300 via the input/output interface 113.

In the next step S224, a start command signal is outputted to the timer 86 via the data bus 112 so as to initiate counting.

In the next step S225, the decision is made as to whether or not a completion signal (refer to step S480 in FIG. 13 described later) transmitted when wireless communication with the RFID circuit element To succeeds has been received from the RFID communication control unit 305 of the module 300. When the completion signal has been received, the flow proceeds to step S235 where the combination of information written to the RFID circuit element To in step S440 described later and the corresponding print information of the label print R to be printed in the print area S by the print head 23 is outputted via the input/output interface 113 and the communication line NW and stored in the information server IS and router server RS. Furthermore, this stored data are stored and maintained within the database of each server IS and RS, for example, for use as reference by the PC 118 as needed. Then, the flow proceeds to step S240 described later. On the other hand, in a case where the completion signal was not received, the decision is made that the condition is not satisfied and the flow proceeds to the next step S227.

In step S227, the decision is made as to whether or not an error signal (refer to step S437 in FIG. 13 described later) transmitted when wireless communication with the RFID circuit element To fails has been received from the RFID communication control unit 305 of the module 300. When the error signal has not been received, the flow returns to the step S225, and step S225 and step S227 are repeated until either the completion signal or the error signal is received. On the other hand, in a case where the error signal was received, the decision is made that the condition is satisfied and the flow proceeds to the next step S230.

In step S230, the decision is made as to whether or not the count value of the timer 86 started in the step S224 has reached the retry time period set in the step S107 (in other words, whether or not the retry time period elapsed after transmission of the information transmission/reception processing start command). When the retry time period has not been elapsed, the decision is made that the condition is not satisfied and the flow returns to the previous step S223 where, after a predetermined time period (the time required for power source shutoff and thorough initialization of the RFID circuit element To by the pausing of the carrier wave), the information transmission/reception processing start command is once again transmitted to the RFID communication control part 305 of the module 300. On the other hand, in a case where the retry time period has elapsed, the decision is made that the condition is satisfied and the flow proceeds to the next step S233.

In step S233, an error display signal is outputted to the PC 118 via the input/output interface 113, displaying the corresponding write failure (error). Then, the flow proceeds to the next step S240.

In step S240, similar to step S145 of FIG. 10, the feeding roller 27, the ribbon take-up roller 106, and the driving roller 51 are rotationally driven so as to resume the transport of the tag label tape 109 with print, and power is supplied to the print head 23 so as to resume the printing of the label print R.

Next, the flow proceeds to step S250 where the decision is made as to whether or not the tag label tape 109 with print has been transported to the above-described print end position (calculated in step S105 of FIG. 10). The decision at this time as well, similar to the above, may be made by detecting, for example, the transported distance after the identifier PM has been detected in the step S120, using a predetermined known method. Until the print end position is reached, the decision is made that the condition is not satisfied and this step is repeated. Once the print end position has been reached, the decision is made that the condition is satisfied, and the flow proceeds to the next step S260.

In step S260, similar to step S135 of FIG. 10, the power supply to the print head 23 is stopped, thereby stopping the printing of the label print R. As a result, the printing of the label print R in the print area S is completed. Then, the routine ends.

The present disclosure is not limited to the procedure indicated in the above flow. Steps may be added or removed or the order of the steps may be changed without departing from the spirit and scope of the present disclosure. For example, when the completion signal is received in step S225 and/or when the error signal is received in step S227, the operator may be notified accordingly by display.

When an RFID label is to be produced, the procedure shown in FIG. 13 is executed by the RFID communication control part 305 of the module 300. Furthermore, the flow of FIG. 13 is started when the RFID communication control part 305 receives the information transmission/reception processing start command from the main body control part 110.

In FIG. 13, first, in step S403, a control signal is outputted to the previously described transmission circuit 306, and transmission of a carrier wave for supplying power to the RFID circuit element To to which writing is to be performed begins via the loop antenna LC. With this arrangement, in the RFID circuit element To, the energy of the carrier wave received via the loop antenna 152 is accumulated by the power source part 154 and used as a driving power source so as to start the IC circuit part 151. Note that the transmission of this carrier wave continues until transmission is stopped in step S435 or step S475 described later.

Subsequently, the flow proceeds to step S405 where a control signal is outputted to the transmission circuit 306, and an interrogation wave subjected to predetermined modulation is transmitted as an inquiry signal (a "Read tag ID" command signal in this example) for acquiring the ID information stored in the RFID circuit element To to the RFID circuit element To subject to writing via the loop antenna LC. As a result, the memory part 157 of the RFID circuit element To is initialized.

Subsequently, in step S415, a reply signal (including tag ID) sent from the RFID circuit element To subject to writing is received via the loop antenna LC in response to the "Read tag ID" command signal, and incorporated via the reception circuit 307.

Next, in step S420, the decision is made as to whether or not the tag ID of the RFID circuit element To has been normally read, based on the received reply signal.

In a case where the decision is made that the condition is not satisfied, the flow proceeds to step S425 where M is incremented by one and then, in step S430, the decision is made as to whether or not M has reached a predetermined value (9, for example; a value set in advance). In a case where M is less than the predetermined value, the decision is made that the condition is not satisfied and the flow returns to step S405 and the same procedure is repeated. In a case where M has reached the predetermined value, the flow proceeds to step S435 where transmission of the carrier wave for supplying power to the RFID circuit element To is stopped and, in the next step S437, an error signal indicating that wireless communication with the RFID circuit element To has failed is transmitted to the main body control part 110, and the flow ends. In this manner, even if initialization ends in failure, initialization is reattempted a predetermined number of times (nine times, for example).

In a case where the decision is made that the condition is satisfied in step S420, the flow proceeds to step S440 where a control signal is outputted to the transmission circuit 306, the tag ID read in step S415 is specified so as to transmit to the RFID circuit element To, to which information writing is to be performed via the loop antenna LC, an interrogation wave subjected to predetermined modulation as a signal configured to write desired data to the memory part 157 in the corresponding tag (a "Write" command signal in this example), and the information is written.

Subsequently, in step S445, a control signal is outputted to the transmission circuit 306, the tag ID read in step S415 is specified so as to transmit to the RFID circuit element To, to which information writing is to be performed via the loop antenna LC, an interrogation wave to which predetermined modulation has been performed as a signal (a "Read" command signal in this example) configured to read data recorded in the memory part 157 of the corresponding tag, and a reply is prompted. Then, in step S450, a reply signal transmitted from the RFID circuit element To, to which writing is to be performed in response to the "Read" command signal is received via the loop antenna LC, and incorporated via the reception circuit 307.

Next, in step S455, the information stored within the memory part 157 of the RFID circuit element To is checked based on the received reply signal, and the decision is made as to whether or not the transmitted predetermined information has been normally stored in the memory part 157, using a known error detecting code (CRC code: Cyclic Redundancy Check, etc).

In a case where the decision is made that the condition is not satisfied, the flow proceeds to step S460 where N is incremented by one. Then, in step S465, the decision is made as to whether or not N has reached a predetermined value. This predetermined value is set so that the total of the number of retries actually performed for the "Read tag ID" command and the number of retries of the "Write" command is a certain value (9, for example). In a case where N is less than the predetermined value, the decision is made that the condition is not satisfied and the flow returns to step S440 and the same procedure is repeated. In a case where N has reached the predetermined value, the flow proceeds to step S435 where the transmission of the carrier wave for supplying power to the RFID circuit element To is similarly stopped and, in the next stop S437, an error signal is transmitted to the main body control part 110, and the flow ends. In this manner, even if writing fails, writing is reattempted a predetermined number of times (nine times in combination with the number of initialization retries, for example).

In a case where the decision is made that the condition is satisfied in step S455, the flow proceeds to step S470 where a control signal is outputted to the transmission circuit 306, the tag ID read in step S415 is specified so as to transmit to the RFID circuit element To, to which information writing is to be performed via the loop antenna LC, an interrogation wave to which predetermined modulation has been performed as a signal (a "Lock" command signal in this example) for prohibiting the replacement of data recorded in the memory part 157 of the corresponding tag, and the writing of new information to the RFID circuit element To is prohibited. As a result, the writing of RFID tag information to the RFID circuit element To, to which writing is to be performed, is completed.

In the next step S475, a control signal is outputted to the transmission circuit 306, and the transmission of the carrier wave for supplying power to the RFID circuit element To is stopped.

Subsequently, the flow proceeds to step S480 where a completion signal indicating completion of wireless communication with the RFID circuit element To is transmitted to the main body control part 110. With the above, the flow ends.

The present disclosure is not limited to the procedure indicated in the above flow. Steps may be added or removed or the order of the steps may be changed without departing from the spirit and scope of the present disclosure.

While the foregoing embodiment has been described in connection with an illustrative scenario in which the RFID tag information is transmitted to the RFID circuit element To to write the information into the IC circuit part 151 to issue the RFID label T, the present disclosure is not limited to such a scenario. Alternatively, the present disclosure can also be applied to an RFID label T which is issued by reading RFID tag information from a read-only RFID circuit element To which previously stores predetermined RFID tag information in a non-rewritable manner, and printing a print corresponding to the read RFID tag information.

In this case, step S440 to step S470 of FIG. 13 may be omitted, and the tag ID and the RFID tag information may be acquired based on the reply signal in step S415. At subsequent step S235 of FIG. 12, a combination of the information to be printed along with the read RFID tag information is saved.

In the above-described tag access processing, a signal exchange such as shown in FIG. 14 is performed between the main body control part 110, the RFID communication control part 305 of the module 300, and the RFID circuit element To. Here, a case where the communication between the RFID communication control part 305 and the RFID circuit element To fails is shown.

As shown in FIG. 14, when an information transmission/reception processing start command is transmitted from the main body control part 110 to the RFID communication control part 305 of the module 300 (step S223 in FIG. 12), the RFID communication control part 305 transmits a carrier wave to the RFID circuit element To (step S403 in FIG. 13). As a result, power is supplied to the IC circuit part 151 of the RFID circuit element To. Subsequently, the RFID communication control part 305 repeatedly transmits the command a predetermined number of times to the RFID circuit element To (step S405 to step S430 and step S440 to step S465 in FIG. 13). In a case where wireless communication does not succeed even though the command has been transmitted the predetermined number of times, the RFID communication control part 305 stops transmission of the carrier wave to the RFID circuit element To (step S435 in FIG. 13). As a result, the power supply to the IC circuit part 151 of the RFID circuit element To is stopped. Additionally, the RFID communication control part 305 transmits an error signal to the main body control part 110 (step S437 in FIG. 13). The main body control part 110 that receives this error signal then determines whether or not the retry time period has elapsed since the first transmission of the information transmission/reception processing start command (step S230 in FIG. 12).

In a case where the retry time period has not elapsed, the main body control part 10 retransmits the information transmission/reception processing start command to the RFID communication control part 305 and repeats the above series of steps. That is, the above series of steps is repeated a predetermined number of times until the retry time period elapses from the time of the first transmission of the information transmission/reception processing start command. In a case where the main body control part 110 receives an error signal from the RFID communication control part 305 and the retry time period elapses, the transmission of the information transmission/reception processing start command to the RFID communication control part 305 of the module 300 is prohibited and the feeding and printing of the tag label tape 109 with print are resumed.

In the above-described embodiment, the command signal ("Read tag ID" command signal) transmitted by the control of the RFID communication control part 305 of the module 300 via the transmission circuit 306 is transmitted to the RFID circuit element To via the loop antenna LC. When the reply signal corresponding to the RFID circuit element To that received the command signal is transmitted, the reply signal is received by the loop antenna LC and the corresponding information is acquired by the RFID communication control part 305 via the reception circuit 307. Then, the command signal is repeatedly transmitted a plurality of times until information acquisition by the RFID communication control part 305 succeeds.

Here, within the RFID tag information communicating apparatus 1, static electricity may be produced for some reason or other, such as the equipment material or member wear and tear, thereby electrically charging the RFID circuit element To during communication. In such a case, while the charge is gradually discharged when the cause of the electrical charging disappears and communication begins, fluctuation arises in the potential within the RFID circuit element To before the charge is sufficiently discharged, resulting in the possibility that the RFID circuit element To which received the command signal will not be able to transmit a reply signal normally. That is, before the charge is sufficiently discharged, even if the reply signal from the RFID circuit element To is abnormal, resulting in failure of information acquisition by the RFID communication control part 305, perhaps due to RFID circuit element To damage or failure or due to the electrostatic charging, whether or not the RFID circuit element To is sound (whether or not the problem will be resolved upon waiting until discharge is completed) cannot be determined. Then, when the charge has been sufficiently discharged and information acquisition by the RFID communication control part 305 fails, it becomes known that the cause was RFID circuit element To damage or failure.

Here, in the present embodiment, based on the control of the main body control part 110, after command signal transmission from the module 300 (refer to step S223 and step S224 in FIG. 12) and after the predetermined electrostatic discharge wait time has elapsed, transmission of the command signal is prohibited (refer to the "Yes" decision in step S230 of FIG. 12). In other words, transmission of the command signal can be continually repeated (refer to the "Yes" decision in step S230 of FIG. 12) until the wait time has elapsed (even if information acquisition by the RFID communication control part 305 fails). With this arrangement, in a case where the charge is not sufficiently discharged and the cause of the abnormal reply signal from the RFID circuit element To is unknown, information acquisition by the RFID communication control part 305 continues, thereby improving the probability that information will be read from the RFID circuit element To. Further, in a case where the charge has been sufficiently discharged and yet the reply signal from the RFID circuit element To is abnormal, the cause is damage or failure of the RFID circuit element To, and thus an energy loss that would result from the useless continuation of communication is prevented.

Further, in the present embodiment, based on the control of the main body control part 110, transmission of the carrier wave by the module 300 is paused based on appropriate timing within the repeated transmissions of the command signal (refer to step S435 in FIG. 13 and FIG. 14). With this arrangement, even if fluctuation arises in the potential in the RFID circuit element To due to electrostatic charging, making normal transmission of the reply signal by the RFID circuit element To not possible, the power source can be shut off and initialization can be performed due to the pausing of the carrier wave. With this arrangement, the RFID circuit element To can subsequently transmit a normal reply signal that is unaffected by electrostatic charging. As a result, the probability that information will be read from the RFID circuit element To is improved.

Furthermore, in a case where static electricity still remains in the RFID circuit element To after initialization and electrical charging occurs, while the charge is gradually discharged when the cause of the electrical charging disappears and communication begins, fluctuation arises in the potential within the RFID circuit element before the charge is sufficiently discharged, resulting in the possibility that the RFID circuit element To will not be able to transmit a reply signal normally. With the present embodiment, as described above, transmission of the carrier wave by the module 300 at appropriate timing (refer to step S435 in FIG. 13 and FIG. 14) is paused while transmission of the command signal repeatedly continues in step S223 until the wait time elapses (until the "No" decision is made in step S230 of FIG. 12). With this arrangement, in a case where the charge is not sufficiently discharged after initialization processing and the reply signal from the RFID circuit element To is abnormal (yet the cause is unknown), information acquisition by the RFID communication control part 305 continues, thereby improving the probability that information will be successfully read from the RFID circuit element To.

At this time particularly, because the RFID circuit element To is disposed in the base tape 101 and the base tape 101 is fed by the feeding roller driving shaft, static electricity is readily produced in the feeding driving location (roller contact location) of the base tape 101, making the RFID circuit element To susceptible to electrical charging. Additionally, when the print head 23 contacts the base tape 101 and the cover film 103 and printing is performed, static electricity is similarly readily produced in that contact location. In these cases, a longer feeding distance and feeding time after electrical charging lead to more discharge, thereby are reducing the amount of the electrical charge. In a case where an electrical charge occurs in the print head 23, because the feeding distance and feeding time after printing starts correspond to the print length, a longer print length leads to more discharge. Further, the susceptibility to electrical charge depends on the attributes of the base tape 101 (or the cover film 103), such as the material and the dimensions in the width direction and thickness direction, etc.

In the present embodiment, in view of the above, the main body control part 110 variably sets the retry time period in accordance with the attributes of the base tape 101 or the cover film 103, the print length, the feeding amount, and the like. With this arrangement, an appropriate retry time period corresponding to the respective electrical charge state and discharge state is set, making it possible to more reliably improve the probability of information reading and prevent energy loss.

Further, particularly in the present embodiment, the properties (the tape width in this embodiment) of the base tape 101 (or the cover film 103) are detected by the cartridge sensor 81, thereby making it possible to efficiently set an appropriate retry time period using correlation information.

Further, particularly in the present embodiment, the loading status of the cartridge 7 and the cartridge information related to the type of the cartridge 7 are detected by the cartridge sensor 81. With this arrangement, even in a case where a plurality of cartridges 7 of a plurality of types having different properties of the base tape 101 are replaced and used in the cartridge holder 6, the type of the cartridge 7 is detected by the cartridge sensor 81, thereby making it possible to detect the properties of the base tape 101.

Further, particularly in the present embodiment, in a case where the retry time period has elapsed from the time of the first transmission of the information transmission/reception processing start command based on the time information outputted by the timer 86 (refer to step S224 of FIG. 12) and the set retry time period, transmission of the command from the RFID communication control part 305 to the RFID circuit element To is not performed. With this arrangement, the information reading probability rate and energy loss prevention are improved.

Further, particularly in the present embodiment, a carrier wave for supplying power to the RFID circuit element To is generated and transmission thereof is started via the loop antenna LC before the command signal is transmitted a plurality of times by the RFID communication control part 305. With this arrangement, power is supplied to the RFID circuit element To of the so-called passive type, making operation possible.

Further, particularly in the present modification, when transmission of the command signal to the RFID circuit element To has been completed a predetermined number of times after transmission of the carrier wave to the RFID circuit element To by the module 300 has started, the main body control part 110 controls the RFID communication control part 305 of the module 300 in coordination so that transmission of the carrier wave to the RFID circuit element To is paused (refer to step S435 of FIG. 13 and FIG. 14) and then resumed after a predetermined pause time (refer to the "OFF" time of FIG. 14) so as to execute transmission of the command signal to the RFID circuit element To the predetermined number of times. In this manner, the command signal is repeatedly transmitted a predetermined number of times after carrier wave transmission begins, thereby making it possible to improve the information reading probability rate by reattempting information acquisition a plurality of times. Subsequently, a predetermined pause time is established and carrier wave transmission is paused, thereby making it possible to shut off the power source and reliably perform initialization. Then, the command signal is once again repeatedly transmitted a plurality of times, thereby making it possible to attempt information acquisition a plurality of times after initialization in a state without an electrostatic charge and reliably perform information reading at a high probability rate.

Further, particularly in the present embodiment, control is performed so that transmission of the carrier wave to the RFID circuit element To by the RFID communication control part 305 of the module 300 is started (step S403) and transmission of the command signal a predetermined number of times to the RFID circuit element To (step S405 to step S430, and step S440 to step S465) is executed in response to output of a single processing start command signal from the main body control part 110 (refer to step S223 of FIG. 12 and FIG. 14). With this arrangement, with simply the output of a single processing start command signal from the main body control part 110, the start of carrier wave transmission and subsequent repeated transmissions of the command signal a predetermined number of times are executed as a set. That is, the series of steps from the start of carrier wave transmission → repeated transmission of the command signal a predetermined number of times → initialization of the RFID circuit element To by the pausing of the carrier wave can be repeated a predetermined number of times. As a result, the removal of the effect of electrostatic charging caused by the initialization of the RFID circuit element To and the subsequent attempts at information acquisition are repeated as a set, making it possible to reliably read information from the RFID circuit element To at a high probability rate.

Further, particularly in the present embodiment, the RFID communication control part 305 of the module 300 transmits a corresponding error signal to the main body control part 110 each time the series of steps including the start of carrier wave transmission to the RFID circuit element To, transmission of the command signal to the RFID circuit element To a plurality of times, and the pausing of carrier wave transmission to the RFID circuit element To ends (refer to step S437 of FIG. 13 and FIG. 14). With this arrangement, for a predetermined time period, the main body control part 110 can pause the carrier wave when information acquisition from the RFID circuit element To is not possible and electrical charging by static electricity is suspected, and detect that initialization processing is in progress. The result can then be displayed and notified to the operator.

Further, particularly in the present embodiment, the RFID communication control part 305 of the module 300 outputs a corresponding completion signal to the main body control part 110 when information acquisition succeeds during the period the series of steps including the start of carrier wave transmission to the RFID circuit element To, transmission of the command signal to the RFID circuit element To a plurality of times, and the pausing of carrier wave transmission to the RFID circuit element To is repeated (refer to step S480 of FIG. 13 and FIG. 14). With this arrangement, the main body control part 110 can detect that information has been acquired without mishap from the RFID circuit element To in a state unaffected by electrostatic charge. The result can then be displayed and notified to the operator.

Note that various modifications may be made according to the present embodiment without departing from the spirit and scope of the disclosure, in addition to the above embodiment. Description will be made below regarding such modifications.

(1) Not Performing Bonding

While the above embodiment has been described in connection with an illustrative scenario in which printing is performed on the cover film 103 that is separate from the base tape 101 containing the RFID circuit element To, and the two are bonded to each other so as to form a so-called laminated type label, the present disclosure is not limited thereto. That is, the present disclosure may also be applied to a case where a so-called non-laminated type label where printing is directly performed on a cover film that is provided on the tag tape is formed.

The detailed structure of a cartridge 7' of this modification is shown in FIG. 15. FIG. 15 is a diagram corresponding to the previously described FIG. 5. Note that the parts identical to those in FIG. 5 are denoted using the same reference numerals, and descriptions thereof will be suitably omitted.

In FIG. 15, the cartridge 7' has a first roll 102' around which is wound a thermal tape 101' and a feeding roller 27' for feeding the thermal tape 101' in a direction out of the cartridge 7'.

The first roll 102' stores, in a manner such that it is wound around a reel member 102a', the strip transparent thermal tape 101', which has a structure in which a plurality of the RFID circuit elements To are serially formed along the longitudinal direction. The thermal tape 101' wound around the first roll 102' has a three-layer structure in this example (refer to the partially enlarged view of FIG. 15), comprising a cover film 101a' formed of PET (polyethylene terephthalate) or the like having a thermal recording layer on the surface, an adhesive layer 101b' formed of a suitable adhesive material, and a separation sheet 101c'. The three layers of the thermal tape 101' are layered in that order from the side rolled to the inside to the side corresponding to the opposite side.

The tag antenna 152 configured to transmit/receive information and constructed in a loop coil shape is provided on the back side of the cover film 101a' in an integrated manner in this example, and the IC circuit part 151 is formed so that it is connected to the loop antenna 152, thereby forming an RFID circuit element To. The separation sheet 101c' is affixed to the cover film 101a' by the adhesive layer 101b' on the back side of the cover film 101a'. A predetermined identifier (a black identifier in this example; may be a hole that passes through the thermal tape 101' formed by laser processing, etc., similar to the above) PM for feeding control is established in a predetermined position (a substantially central position of the tag antenna 152 in the feeding direction in this example) corresponding to each RFID circuit element To on the front side of the separation sheet 101c', similar to the separation sheet 101d.

When the cartridge 7' is loaded to the cartridge holder 6 and the roller holder 25 (not shown in FIG. 15) is moved to the contact position from a distant location, the thermal tape 101' is brought between the print head 23 and the platen roller 26, and then between the feeding roller 27' and a sub-roller 28'. Then, the feeding roller 27', the sub-roller 28', and the platen roller 26 are synchronously rotated so as to feed out the thermal tape 101' from the first roll 102'.

This fed out thermal tape 101' is supplied to the print head 23 located on the feeding direction downstream side. Power is supplied to the plurality of heating elements from the printhead driving circuit 120 (refer to FIG. 6), causing the print head 23 to print data in the print area S on the front side of the cover film 101a' of the thermal tape 101' so as to form a tag label tape 109' with print, which is subsequently discharged to outside the cartridge 7'.

The configurations of all other components are the same as those of the above embodiment, and descriptions thereof will be omitted.

The present modification also provides similar advantages to those in the foregoing embodiment.

While in the configuration of the above modification printing is performed by using thermal tape as the tag tape, particularly by simply the heat generated by the print head 23 and not ink ribbon, etc., the present disclosure is not limited thereto, and printing may be performed using ordinary ink ribbon as in the case of the above embodiment.

The detailed structure of a cartridge 7" of a modification using ordinary ink ribbon is shown in FIG. 16. FIG. 16 is a diagram corresponding to the above-described FIG. 15 and the previously described FIG. 5. Note that the parts identical to those in FIG. 15 and FIG. 5 are denoted using the same reference numerals, and descriptions thereof will be suitably omitted.

In FIG. 16, the cartridge 7" of the modification has a first roll 102" around which is wound abase tape 101".

The first roll 102" stores, in a manner such that it is wound around a reel member 102a", the strip transparent base tape 101", which has a structure in which a plurality of the RFID circuit elements To are serially formed along the longitudinal direction.

The base tape 101" wound around the first roll 102" has a three-layer structure in this example (refer to the partially enlarged view of FIG. 16), comprising a colored base film 101a" formed of PET (polyethylene terephthalate) or the like, an adhesive layer 101b" formed of a suitable adhesive material, and a separation sheet 101c". The three layers of the base tape 101" are layered in that order from the side rolled to the inside to the side corresponding to the opposite side.

The tag antenna 152 configured to transmit/receive information and constructed in a loop coil shape is provided on the back side of the base film 101a" in an integrated manner in this example, and the IC circuit part 151 is formed so that it is connected to the loop antenna 152, thereby forming an RFID circuit element To. The separation sheet 101c" is affixed to the base film 101a" by the adhesive layer 101b" on the back side of the base film 101a". A predetermined identifier (a black identifier in this example; may be a hole that passes through the base tape 101" formed by laser processing, etc., similar to the above) PM is established in a predetermined position (a substantially central position of the loop antenna 152 in the feeding direction in this example) corresponding to each RFID circuit element To on the front side of the separation sheet 101c", similar to the above.

When the cartridge 7" is loaded to the cartridge holder 6 and the roller holder 25 (not shown in FIG. 16) is moved to the contact position from a distant location, the base tape 101" and the ink ribbon 105 are brought between the print head 23 and the platen roller 26, and then between the feeding roller 27' and the sub-roller 28'. Then, the feeding roller 27', the sub-roller 28', and the platen roller 26 are synchronously rotated so as to feed out the base tape 101" from the first roll 102".

This fed out base tape 101" is supplied to the print head 23 located on the feeding direction downstream side. Power is supplied to the plurality of heating elements from the printhead driving circuit 120 (refer to FIG. 6), causing the print head 23 to print data in the print area S on the front side of the base film 101a" of the base tape 101" so as to form a tag label tape 109" with print, which is subsequently discharged to outside the cartridge 7".

The configurations of all other components are the same as those of the previously described embodiment, and descriptions thereof will be omitted.

In the present modification as well, the same effect as that of the above FIG. 17 is achieved.

(2) Other

While the above has been described in connection with an illustrative scenario in which the tag label tape 109 with print that had been printed and accessed (performed reading/writing with) the RFID circuit element To is cut by the cutting mechanism 15 so as to form the RFID label T, the present disclosure is not limited thereto. That is, in a case where a label mount (a so-called die cut label) separated in advance to a predetermined size corresponding to the label is continuously disposed on the tape fed out from the roll, the present disclosure may also be applied to a case where the label is not cut by the cutting mechanism 15 but rather the label mount (a label mount containing the accessed RFID circuit element To on which corresponding printing has been performed) only is peeled from the tape after the tape has been discharged from the discharging exit 16 so as to form the RFID label T.

Furthermore, while the above has been described in connection with an illustrative scenario in which the base tape 101, etc., is wound around a reel member so as to form a roll, and the roll is disposed within the cartridge 7 so as to feed out the base tape 101, the present disclosure is not limited thereto. For example, an arrangement can be made as follows. Namely, a long-length or rectangular tape or sheet (including tape cut to a suitable length after being supplied from a roll) in which at least one RFID circuit element To is disposed is stacked (laid flat and layered into a tray shape, for example) in a predetermined housing part so as to form a cartridge. The cartridge is then mounted to the cartridge holder provided to the label producing apparatus. Then, the tape or sheet is supplied or fed from the housing part, and printing or writing is performed so as to produce RFID labels.

Furthermore, a configuration wherein the above-described roll is directly removably loaded to the label producing apparatus side, or a configuration wherein a long, flat paper-shaped or strip-shaped tape or sheet is moved one piece at a time from outside the label producing apparatus by a predetermined feeder mechanism and supplied to within the label producing apparatus are also possible. Additionally, the structure of the roll is not limited to a type that is removable from the label producing apparatus main body, such as the cartridge 7, but rather the first roll 102 may be provided as a so-called installation type or an integrated type that is not removable from the apparatus main body side. In this case as well, similar advantages are achieved.

Additionally, other than those previously described, approaches according to the respective embodiments and exemplary modifications may be utilized in combination as appropriate.

What is claimed is:

1. An RFID tag information communicating apparatus, comprising:
    an apparatus antenna device that transmits/receives information via wireless communication to/from an RFID circuit element including an IC circuit part that stores information and a tag antenna that transmits/receives information;
    a command transmission portion that generates and transmits via said apparatus antenna device a command signal for reading information from said RFID circuit element;
    an information acquisition portion that attempts a reception of a reply signal transmitted from said RFID circuit element via said apparatus antenna device in response to said command signal so as to acquire information; and
    an electrostatic-safe communication control portion that controls at least said command transmission portion and repeatedly transmit a plurality of times said command signal to said RFID circuit element so that information substantially unaffected by static electricity is acquired by said information acquisition portion; wherein:
    said electrostatic-safe communication control portion is a prohibition control portion that prohibits transmission of said command signal by said command transmission portion after a predetermined electrostatic discharge wait time has elapsed after transmission of said command signal from said command transmission portion; and
    said RFID tag information communication apparatus further comprises:
    a feeding device that feeds a tag medium where said RFID circuit element is disposed;
    a printing device that prints desired print on said tag medium to be fed by said feeding device or a print-receiving medium to be bonded thereto; and
    a setting portion that variably sets said wait time used in said prohibition control portion in accordance with at least one of properties of said tag medium or said print-receiving medium, a print length of said desired print, and a feeding amount by said feeding device.

2. The RFID tag information communicating apparatus according to claim 1, further comprising a determining portion that determines whether or not information reading from said RFID circuit element has succeeded based on the information acquisition result of said information acquisition portion, after transmission of said command signal to said RFID circuit element by said command transmission portion, wherein: said command signal is retransmitted by said command transmission portion when said determining portion determines that said information acquisition was unsuccessful.

3. The RFID tag information communicating apparatus according to claim 1, wherein: said setting portion sets said wait time based on a correlation established between a combination of at least two items from among the properties of said tag medium or said print-receiving medium, the print length of said desired print, and the feeding amount by said feeding device, and said wait time corresponding thereto.

4. The RFID tag information communicating apparatus according to claim 3, further comprising a detecting device that detects the properties of said tag medium or said print-receiving medium, wherein: said setting portion sets said wait time based on said correlation corresponding to the detection result of said detecting device.

5. The RFID tag information communicating apparatus according to claim 4, further comprising a cartridge holder that enables removal of a cartridge that includes said tag medium having a plurality of said RFID circuit elements in a continually suppliable manner, wherein: said detecting device detects the type of said cartridge loaded to said cartridge holder.

6. The RFID tag information communicating apparatus according to claim 1, wherein: said prohibition control portion uses time information and said wait time set by said setting portion so as to control the prohibition of transmission of said command signal by said command transmission portion.

7. The RFID tag information communicating apparatus according to claim 1, further comprising a carrier wave transmission portion that generates a carrier wave for supplying power to said RFID circuit element and starts a transmission of said carrier wave via said apparatus antenna device before said command transmission portion transmits said command signal a plurality of times.

8. The RFID tag information communicating apparatus according to claim 1, further comprising a carrier wave transmission portion that generates a carrier wave for supplying power to said RFID circuit element and starts a transmission of said carrier wave via said apparatus antenna device before said command transmission portion transmits said command signal a plurality of times, wherein: said electrostatic-safe communication control portion is a coordination control portion that controls in coordination said command transmission portion and said carrier wave transmission portion so that an operation wherein transmission of said carrier wave by said carrier wave transmission portion is paused and later resumed is included within the repetition of transmissions of said command signal by said command transmission portion.

9. The RFID tag information communicating apparatus according to claim 8, wherein: said coordination control portion controls in coordination said command transmission portion and said carrier wave transmission portion in a manner that, after the start of transmission of said carrier wave to said RFID circuit element by said carrier wave transmission portion, transmission of said carrier wave to said RFID circuit element by said carrier wave transmission portion is paused when a transmission operation of a first predetermined number of times of said command signal to said RFID circuit element is completed by said command transmission portion, and the transmission of said carrier wave to said RFID circuit element is resumed by said carrier wave transmission portion after a predetermined pause time so as to execute the transmission operation of said first predetermined number of times of said command signal to said RFID circuit element by said command transmission portion.

10. The RFID tag information communicating apparatus according to claim 9, wherein: said command transmission portion and said carrier wave transmission portion are controlled by said coordination control portion so that the start of transmission of said carrier wave to said RFID circuit element by said carrier wave transmission portion and the transmission operation of said first predetermined number of times of said command signal to said RFID circuit element by said command transmission portion are executed in response to the output of a single control signal from said coordination control portion.

11. The RFID tag information communicating apparatus according to claim 10, wherein: said command transmission portion and said carrier wave transmission portion are controlled by said coordination control portion so that the series of steps including the start of transmission of said carrier wave to said RFID circuit element by said carrier wave transmission portion, the plurality of transmissions of said command signal to said RFID circuit element by said command transmission portion, and the pausing of transmission of said carrier wave to said RFID circuit element by said carrier wave transmission portion is repeated a second predetermined number of times until information acquisition by said information acquisition portion succeeds.

12. The RFID tag information communicating apparatus according to claim 11, further comprising a pause notification signal output portion that outputs a corresponding carrier wave pause notification signal each time a series of steps includitig the start of transmission of said carrier wave to said RFID circuit element by said carrier wave transmission portion, the plurality of transmissions of said command signal to said RFID circuit element by said command transmission portion, and the pausing of transmission of said carrier wave to said RFID circuit element by said carrier wave transmission portion ends.

13. The RFID tag information communicating apparatus according to claim 12, further comprising a prohibition control portion that prohibits transmission of said carrier wave and transmission of said command signal after a predetermined electrostatic discharge wait time has elapsed after transmission of said carrier wave from said carrier wave transmission portion and transmission of said command signal from said command transmission portion starts, in response to output of a control signal from said coordination control portion.

14. The RFID tag information communicating apparatus according to claim 11, further comprising a success notification signal output portion that outputs a corresponding acquisition success notification signal when information is successfully acquired by said information acquisition portion during the period a series of steps including the start of transmission of said carrier wave to said RFID circuit element by said carrier wave transmission portion, the plurality of transmissions of said command signal to said RF1D circuit element by said command transmission portion, and the pausing of transmission of said carrier wave to said RFID circuit element by said carrier wave transmission portion is repeated.

* * * * *